United States Patent
Taga et al.

(10) Patent No.: US 11,186,388 B2
(45) Date of Patent: Nov. 30, 2021

(54) WEIGHING AND PACKAGING SYSTEM

(71) Applicant: ISHIDA CO., LTD., Kyoto (JP)

(72) Inventors: Keiji Taga, Ritto (JP); Ryuichi Kurosawa, Ritto (JP); Makoto Ichikawa, Ritto (JP)

(73) Assignee: ISHIDA CO., LTD., Kyoto (JP)

(*) Notice: Subject to any disclaimer, the term of this patent is extended or adjusted under 35 U.S.C. 154(b) by 9 days.

(21) Appl. No.: 16/788,232

(22) Filed: Feb. 11, 2020

(65) Prior Publication Data
US 2020/0255169 A1 Aug. 13, 2020

(30) Foreign Application Priority Data

Feb. 13, 2019 (JP) ............................. JP2019-023838
Jan. 14, 2020 (JP) ............................. JP2020-003372

(51) Int. Cl.
*B65B 1/32* (2006.01)
*B65B 43/04* (2006.01)
(Continued)

(52) U.S. Cl.
CPC ................ *B65B 1/32* (2013.01); *B65B 43/04* (2013.01); *B65B 57/02* (2013.01); *B65B 57/06* (2013.01);
(Continued)

(58) Field of Classification Search
CPC .... B65B 1/06; B65B 1/32; B65B 9/20; B65B 37/18; B65B 57/02; B65B 57/06;
(Continued)

(56) References Cited

U.S. PATENT DOCUMENTS 7,752,826 B2 * 7/2010 Yamaguchi ............ G01G 19/38
53/55
2001/0020553 A1 * 9/2001 Tamai .................. G01G 19/393
177/25.18
(Continued)

FOREIGN PATENT DOCUMENTS

JP H9-301327 11/1997
JP 2006-199488 A 8/2006
KR 101841425 B1 3/2018

OTHER PUBLICATIONS

The Search Report from the corresponding European Patent Application No. 20156573.6 dated Jun. 23, 2020.
(Continued)

*Primary Examiner* — Valentin Neacsu
(74) *Attorney, Agent, or Firm* — Shinjyu Global IP

(57) ABSTRACT

A weighing and packaging system includes a plurality of weighing machines, a plurality of packaging machines, and a control unit. The plurality of weighing machines are configured to weigh articles supplied thereto. The plurality of packaging machines, each of which forms a weighing and packaging unit with a corresponding weighing machine among the plurality of weighing machines, are configured to receive a supply of the articles weighed and discharged by the corresponding weighing machine, and package the articles supplied thereto. The control unit is configured to, in a case where a problem occurs in at least one of weighing by the weighing machine and packaging by the packaging machine in any of the weighing and packaging units, change processing capacities of the weighing machine and the packaging machine of at least some of the weighing and packaging units other than the weighing and packaging units in which the problem occurs.

3 Claims, 7 Drawing Sheets

(51) Int. Cl.
*B65B 57/18* (2006.01)
*B65B 57/06* (2006.01)
*B65B 57/10* (2006.01)
*B65B 57/02* (2006.01)
*B65B 57/14* (2006.01)
*B65B 57/08* (2006.01)
*B65B 57/16* (2006.01)

(52) U.S. Cl.
CPC .............. *B65B 57/08* (2013.01); *B65B 57/10* (2013.01); *B65B 57/14* (2013.01); *B65B 57/16* (2013.01); *B65B 57/18* (2013.01)

(58) Field of Classification Search
CPC ....... B65B 57/10; B65B 57/14; B65B 65/006; G01G 19/393
USPC ...................................................... 53/502, 52
See application file for complete search history.

(56) References Cited

U.S. PATENT DOCUMENTS

| | | | | |
|---|---|---|---|---|
| 2004/0104054 A1* | 6/2004 | Kageyama | ........... | G01G 19/393 177/119 |
| 2004/0107845 A1* | 6/2004 | Sunter | ...................... | B07C 5/32 99/534 |
| 2004/0134689 A1* | 7/2004 | Fujii | .................... | G01G 19/393 177/18 |
| 2004/0231299 A1* | 11/2004 | Yakushigawa | .......... | A23L 27/00 53/474 |
| 2006/0231295 A1* | 10/2006 | Yamaguchi | ............ | G01G 19/38 177/25.18 |
| 2008/0091299 A1* | 4/2008 | Yoshikawa | ........... | B65B 51/303 700/242 |
| 2010/0046703 A1* | 2/2010 | Hirose | ................... | G01G 9/005 378/54 |
| 2011/0023423 A1* | 2/2011 | Iwasaki | ................ | B65B 9/2028 53/510 |
| 2015/0183532 A1* | 7/2015 | Longest, Jr. | ............. | B65B 1/46 53/452 |
| 2016/0272354 A1* | 9/2016 | Moto | ..................... | B25J 9/0087 |
| 2017/0235296 A1* | 8/2017 | Holzkamper | ......... | G06F 3/0346 700/83 |
| 2018/0354661 A1* | 12/2018 | Koike | ....................... | B65B 9/10 |
| 2019/0210298 A1* | 7/2019 | Kageyama | ................ | B65B 1/32 |
| 2020/0391895 A1* | 12/2020 | Pearson | .................... | B65B 1/32 |

OTHER PUBLICATIONS

The Examination Report from the corresponding Indian Patent Application No. 202014005288 dated May 20, 2021.

\* cited by examiner

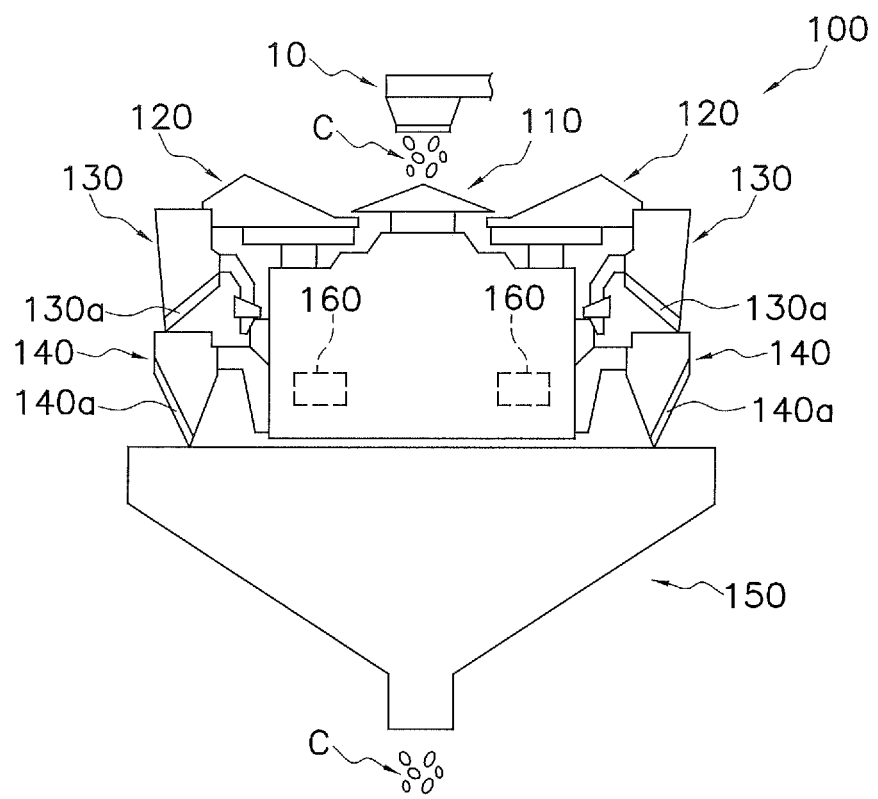
F I G. 3

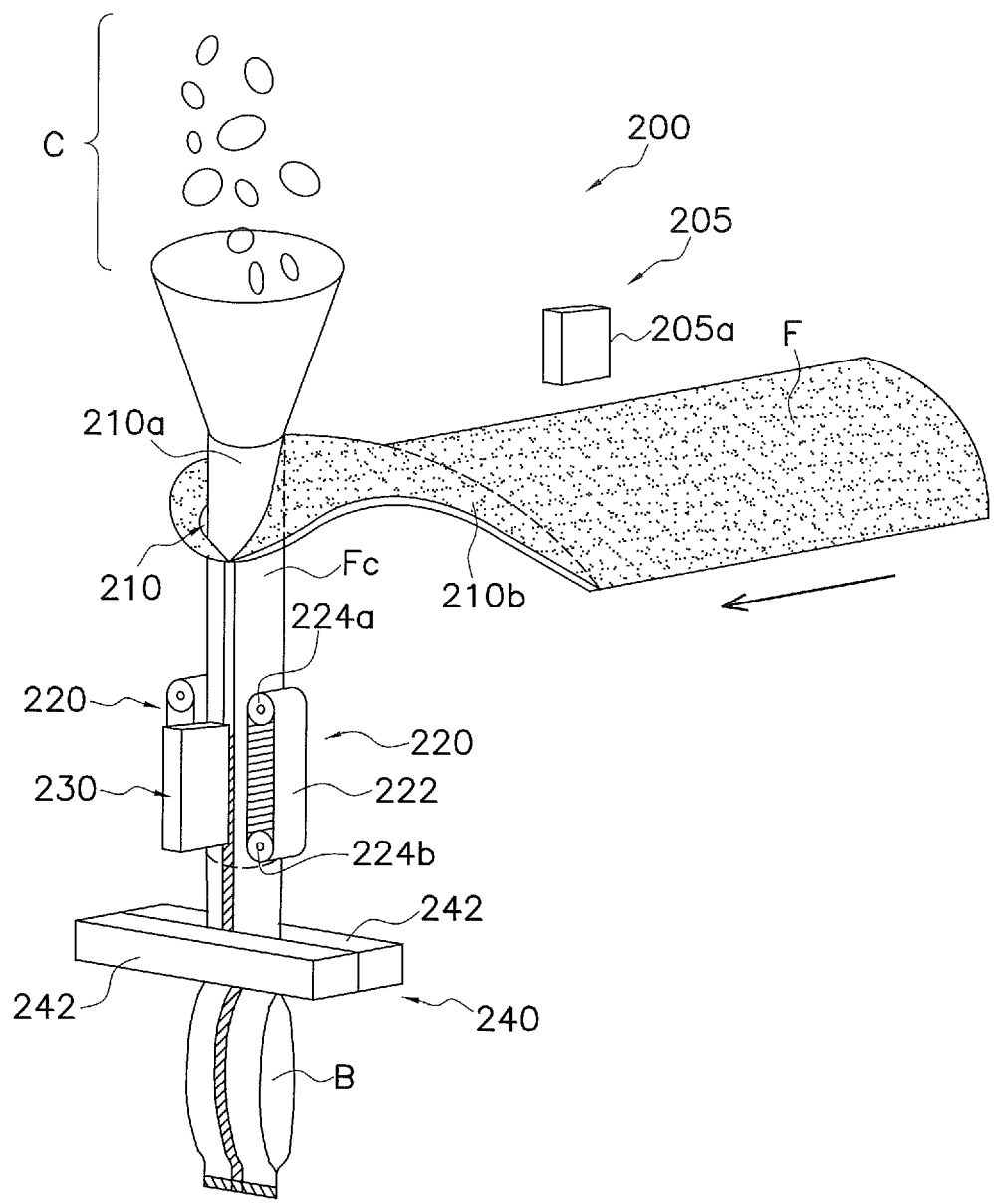
F I G. 4

WEIGHING AND PACKAGING SYSTEM

CROSS-REFERENCE TO RELATED APPLICATIONS

This application claims priority to Japanese Patent Application Nos. 2019-23838, filed on Feb. 13, 2019, and 2020-3372, filed on Jan. 14, 2020. The contents of those applications are incorporated by reference herein in their entireties.

TECHNICAL FIELD

The present invention relates to a weighing and packaging system that weighs articles and packages the articles that have been weighed.

BACKGROUND ART

Conventionally, weighing and packaging systems which, as in Japanese Patent Application Publication No. JP-A No. 2006-199488, weigh and package articles using plural weighing and packaging units, each of which includes a weighing machine that weighs the articles and a packaging machine that packages the articles that have been weighed, have been known. In Japanese Patent Application Publication No. JP-A No. 2006-199488, an improvement in the productivity of the weighing and packaging system is achieved by automatically loading film rolls serving as raw material for bags in the packaging machines.

BRIEF SUMMARY

In a weighing and packaging system that has plural weighing and packaging units, there are cases where, due to various reasons, a problem occurs in some of the weighing machines and/or the packaging machines. Here, what is meant by a problem in the weighing machines and/or the packaging machines is the occurrence of an event where, during operation, the processing capacity of the weighing machine and/or the packaging machine is reduced or the weighing machine and/or the packaging machine unintentionally stops. In the weighing and packaging system disclosed in Japanese Patent Application Publication No. JP-A No. 2006-199488, when a problem occurs in some of the weighing and packaging units due to a problem occurred in a weighing machine and/or a packaging machine, the processing capacity of the weighing and packaging system is reduced by a reduced amount of the processing capacity in the weighing and packaging unit in which the problem occurred.

An object of the present invention is to provide a weighing and packaging system that has plural weighing and packaging units and can reduce a reduction in its processing capacity caused by a problem in some of the weighing and packaging units.

A weighing and packaging system pertaining to a first aspect of the invention has plural weighing machines, plural packaging machines, and a control unit. The weighing machines weigh articles that are supplied thereto. Each of the plural packaging machines configures a weighing and packaging unit with the weighing machine with which it forms a pair out of the plural weighing machines. Each of the plural packaging machines receives a supply of the articles that are weighed and discharged by the weighing machine with which it forms a pair and packages the articles that are supplied thereto. In a case where a problem is occurring in at least one of the weighing by the weighing machine and the packaging by the packaging machine in any of the weighing and packaging units, the control unit changes the processing capacities of the weighing machine and the packaging machine of at least some of the weighing and packaging units other than the weighing and packaging unit in which the problem is occurring.

In the weighing and packaging system pertaining to the first aspect, in a case where a problem is occurring in any of the plural weighing and packaging units, the processing capacities of the weighing and the packaging are changed in the weighing and packaging units other than the weighing and packaging unit in which the problem is occurring. For that reason, a reduction in the processing capacity of the weighing and packaging system caused by a problem in some of the weighing and packaging units can be reduced.

A weighing and packaging system pertaining to a second aspect of the invention is the weighing and packaging system of the first aspect, wherein the control unit is installed in at least any of the weighing and packaging units.

In the weighing and packaging system pertaining to the second aspect, the control unit is provided in the weighing and packaging units, so when a problem occurs in some of the weighing and packaging units, the processing capacities of the other weighing and packaging units can be changed with a relatively simple and inexpensive configuration.

A weighing and packaging system pertaining to a third aspect of the invention is the weighing and packaging system of the first aspect or the second aspect, wherein the control unit notifies the weighing and packaging unit that is to be instructed to change its processing capacity, as an instruction to change the processing capacities of the weighing machine and the packaging machine, that at least one of the weighing machine and the packaging machine is stopped in the weighing and packaging unit in which the problem is occurring.

In the weighing and packaging system pertaining to the third aspect, when a problem occurs in any of the weighing and packaging units, the control unit does not produce a special command but simply notifies that the weighing machine and/or the packaging machine is stopped to change the processing capacities of the other weighing and packaging units. For that reason, in this weighing and packaging system, when a problem occurs in some of the weighing and packaging units, the processing capacities of the other weighing and packaging units can be changed with a relatively simple and inexpensive configuration.

A weighing and packaging system pertaining to a fourth aspect to the invention is the weighing and packaging system of any of the first aspect to the third aspect, wherein the control unit sends, via a physical signal line, an instruction to change the processing capacities of the weighing machine and the packaging machine.

In this weighing and packaging system, the instruction to change the processing capacities is sent by the physical signal line. For that reason, in this weighing and packaging system, in a case where a problem is occurring in any of the weighing and packaging units, the processing capacities of the weighing machine and the packaging machine of at least some of the other weighing and packaging units can be reliably changed.

A weighing and packaging system pertaining to a fifth aspect of the invention is the weighing and packaging system of the fourth aspect, wherein the control unit utilizes a contact signal for the instruction to change the processing capacities of the weighing machine and the packaging machine.

In this weighing and packaging system, by utilizing the contact signal, when a problem occurs in some of the weighing and packaging units, the processing capacities of at least some of the other weighing and packaging units can be changed with a relatively simple and inexpensive configuration.

A weighing and packaging system pertaining to a sixth aspect of the invention is the weighing and packaging system of the fifth aspect, wherein the contact signal is a signal that indicates whether or not the weighing machine and/or the packaging machine is operating.

In this weighing and packaging system, when a problem occurs in some of the weighing and packaging units, the processing capacities of at least some of the other weighing and packaging units can be changed using the contact signal that indicates that the weighing machine and/or the packaging machine is operating or has stopped—in other words, with a relatively simple and inexpensive configuration.

A weighing and packaging system pertaining to a seventh aspect of the invention is the weighing and packaging system of any of the first aspect to the sixth aspect, wherein the packaging machine whose processing capacity is changed by the control unit has its packageable capacity set to a first capacity. When the packaging machine whose processing capacity is changed by the control unit is not instructed to change its processing capacity by the control unit, it runs at a second capacity lower than the first capacity by increasing its standby time.

In the weighing and packaging system pertaining to the seventh aspect, the packaging machine is set so as to be capable of running at a high processing capacity beforehand, so it is easy for the packaging machine to respond immediately to an instruction to change its processing capacity from the control unit.

A weighing and packaging system pertaining to an eighth aspect of the invention is the weighing and packaging system of any of the first aspect to the seventh aspect, wherein the weighing machine whose processing capacity is changed by the control unit has its weighable capacity set to a third capacity. When the weighing machine whose processing capacity is changed by the control unit is not instructed to change its processing capacity by the control unit, it runs at a fourth capacity lower than the third capacity by increasing its standby time.

In the weighing and packaging system pertaining to the eighth aspect, the weighing machine is set so as to be capable of running at a high processing capacity beforehand, so it is easy for the weighing machine to respond immediately to an instruction to change its processing capacity from the control unit.

In the weighing and packaging system pertaining to the present invention, in a case where a problem is occurring in any of the weighing and packaging units, the processing capacities of the weighing and the packaging are changed in the weighing and packaging unit/units other than the weighing and packaging unit in which the problem is occurring. For that reason, a reduction in the processing capacity of the weighing and packaging system caused by a problem in some of the weighing and packaging units can be reduced.

BRIEF DESCRIPTION OF THE DRAWINGS

FIG. 3 is a drawing showing the schematic configuration of a combination weighing machine included in the weighing and packaging unit of FIG. 2.

FIG. 4 is a drawing showing the schematic configuration of a bag-making and packaging machine included in the weighing and packaging unit of FIG. 2.

DETAILED DESCRIPTION

An embodiment of a weighing and packaging system pertaining to the invention will be described with reference to the drawings.

It will be noted that the embodiment described below is merely illustrative. It will also be understood that various changes can be made to the embodiment of this disclosure without departing from the spirit and scope of the disclosure.

(1) Overall Configuration of Weighing and Packaging System

Figure 1:
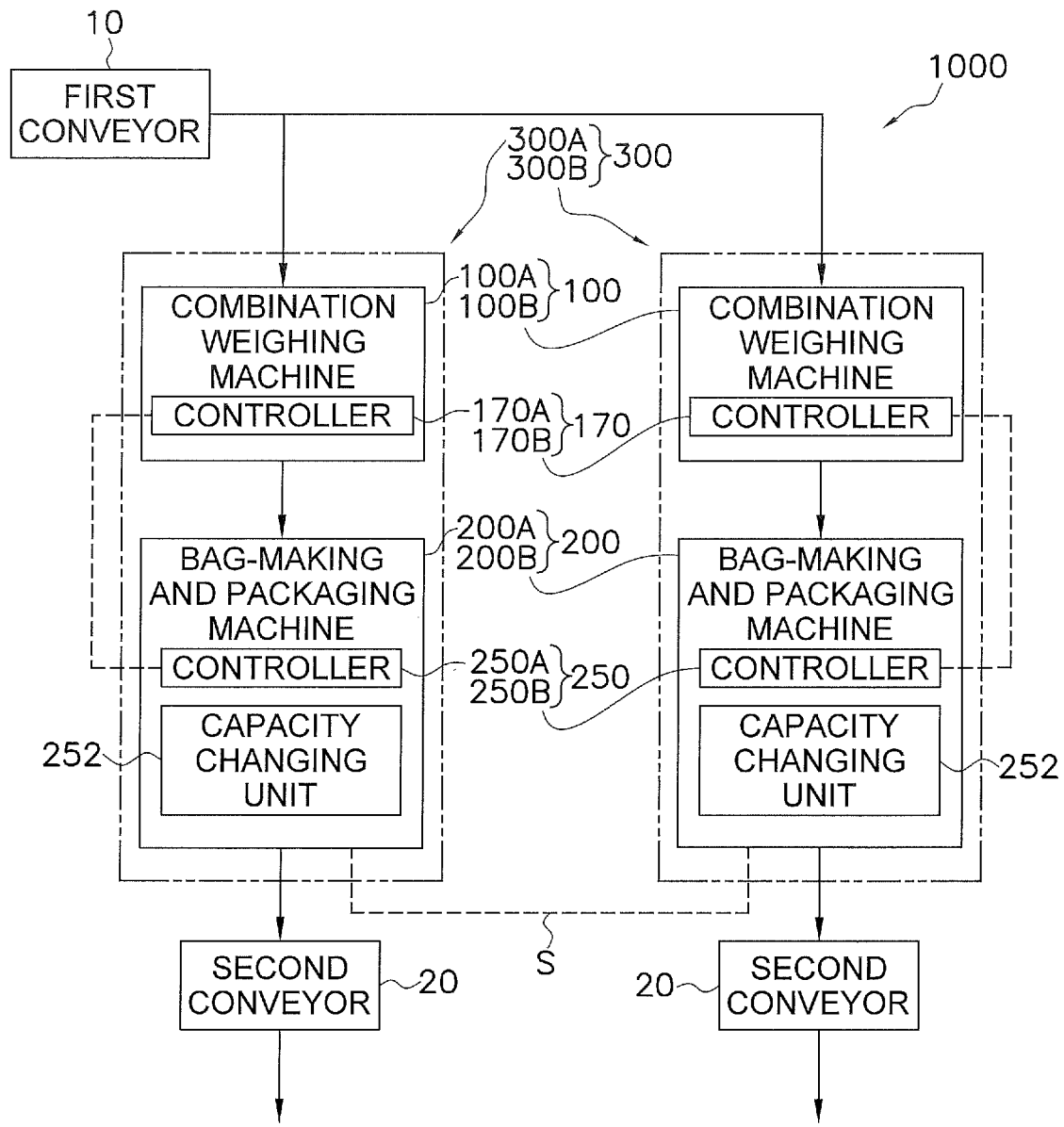
FIG. 1 is a block diagram of a weighing and packaging system pertaining to an embodiment of the invention.
Figure 2:
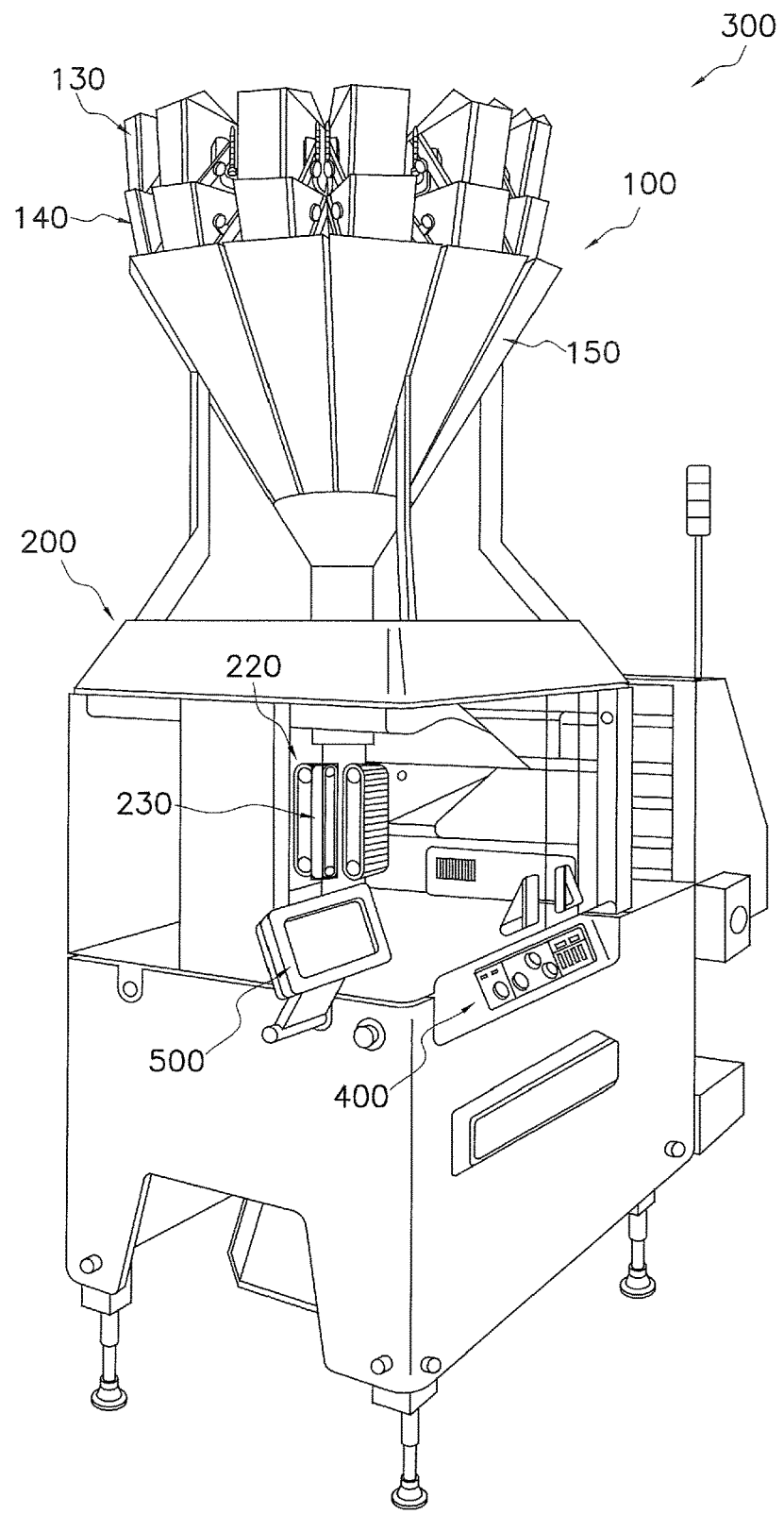
FIG. 2 is a schematic perspective view of a weighing and packaging unit of the weighing and packaging system of FIG. 1.

The overall configuration of a weighing and packaging system 1000 pertaining to the embodiment of the invention will be now described with reference to FIG. 1 and FIG. 2. FIG. 1 is a block diagram of the weighing and packaging system 1000. FIG. 2 is a schematic perspective view of a weighing and packaging unit 300 included in the weighing and packaging system 1000.

The weighing and packaging system 1000 is a system that weighs articles C that are supplied to a first conveyor 10 located upstream of the weighing and packaging system 1000 and packages the articles C that have been weighed to thereby produce bags B (packages). The bags B that have been produced by the weighing and packaging system 1000 are conveyed by second conveyors 20 located downstream of the weighing and packaging system 1000.

The weighing and packaging system 1000 has plural weighing machines and plural packaging machines. In this embodiment, the weighing and packaging system 1000 has combination weighing machines 100 as an example of the weighing machines and has bag-making and packaging machines 200 as an example of the packaging machines. In this embodiment, the weighing and packaging system 1000 has two combination weighing machines 100 and two bag-making and packaging machines 200. Each of the plural bag-making and packaging machines 200 forms a pair with one of the plural combination weighing machines 100 to configure a weighing and packaging unit 300. That is, in this embodiment, the weighing and packaging system 1000 has two weighing and packaging units 300. It will be noted that the number of weighing and packaging units is not limited to two and that the weighing and packaging system 1000 can also have three or more weighing and packaging units 300.

In this embodiment, the two combination weighing machines 100 are devices with the same specifications. Furthermore, in this embodiment, the two bag-making and packaging machines 200 are devices with the same specifications. Below, for convenience of description, there will be cases where the two combination weighing machines 100 are called by different names, with one of the combination weighing machines 100 being called "the combination weighing machine 100A" and the other being called "the combination weighing machine 100B." Furthermore, below, for convenience of description, there will be cases where the two bag-making and packaging machines 200 are called by different names, with the bag-making and packaging machine 200 that forms a pair with the combination weighing machine 100A being called "the bag-making and packaging machine 200A" and the bag-making and packaging machine 200 that forms a pair with the combination weighing machine 100B being called "the bag-making and packaging machine 200B." Furthermore, there will be cases where the weighing and packaging unit 300 configured by the combination weighing machine 100A and the bag-making and packaging machine 200A is called "the weighing and packaging unit 300A." Furthermore, there will be cases where the weighing and packaging unit 300 configured by the combination weighing machine 100B and the bag-making and packaging machine 200B is called "the weighing and packaging unit 300B."

The combination weighing machines 100 are devices that perform combination weighing of the articles C that are supplied by the first conveyor 10 and supply a predetermined quantity of the articles C to the bag-making and packaging machines 200 with which they form a pair. As shown in FIG. 2, the combination weighing machines 100 are disposed above the bag-making and packaging machines 200 with which they form a pair and supply the articles C to the bag-making and packaging machines 200 with which they form a pair by discharging and dropping the articles C. The detailed configuration and actions of the combination weighing machines 100 will be described later.

The bag-making and packaging machines 200 are devices that receive the supply of the articles C from the combination weighing machines 100 with which they form a pair and package the supplied articles C in the bags B that are made from sheet-like film F. In other words, the bag-making and packaging machines 200 are devices that receive the supply of the articles C from the combination weighing machines 100 with which they form a pair and make the bags B in which the articles C are sealed. The detailed configuration and actions of the bag-making and packaging machines 200 will be described later.

As shown in FIG. 2, each weighing and packaging unit 300 has, in addition to one combination weighing machine 100 and one bag-making and packaging machine 200, operation switches 400 and a liquid crystal display 500. The liquid crystal display 500 is a touch panel display. The liquid crystal display 500 is disposed in a position where the operator of the operation switches 400 can see it. The operation switches 400 and the liquid crystal display 500 function as input devices that receive instructions with respect to the weighing and packaging unit 300 and settings relating to the weighing and packaging unit 300. The liquid crystal display 500 functions as an output device that displays information relating to the weighing and packaging unit 300. The combination weighing machine 100 and the bag-making and packaging machine 200 of each weighing and packaging unit 300 run in accordance with input from the operation switches 400 and the liquid crystal display 500 and output of sensors (not shown in the drawings) provided in the weighing and packaging unit 300.

(2) Combination Weighing Machines

The combination weighing machines 100 will now be described with reference to FIG. 3 in addition to FIG. 1 and FIG. 2. FIG. 3 is a drawing showing the schematic configuration of the combination weighing machines 100. The description of the combination weighing machines 100 described here holds true for both the combination weighing machine 100A and the combination weighing machine 100B.

The combination weighing machines 100 are devices that perform combination weighing of the articles C that are supplied by the first conveyor 10 and supply a predetermined quantity of the articles C to the bag-making and packaging machines 200 with which they form a pair. Here, "predetermined quantity of the articles C" means articles C whose weight is in a predetermined range allowed with respect to a reference value (an ideal weight of the articles C to be put into the bags B).

Each combination weighing machine 100 mainly has a dispersion table 110, plural troughs 120, plural pool hoppers 130, plural weigh hoppers 140, plural weight sensors 160, a collection chute 150, and a controller 170 (see FIG. 1 and FIG. 3). The combination weighing machine 100 has the same number of troughs 120, pool hoppers 130, weigh hoppers 140, and weight sensors 160.

(2-1) Dispersion Table

As shown in FIG. 3, the dispersion table 110 is a member with the shape of a flattened circular cone. The articles C that the first conveyor 10 drops are supplied to the dispersion table 110. The dispersion table 110 is vibrated by a vibration device (not shown in the drawings). The vibration of the dispersion table 110 causes the articles C that have dropped from the first conveyor 10 onto the dispersion table 110 to disperse and drop into the plural troughs 120 disposed around the dispersion table 110.

(2-2) Troughs

The plural troughs 120 are disposed around the dispersion table 110. The plural troughs 120 are disposed so as to extend radially around the dispersion table 110. The troughs 120 are vibrated by a vibration device (not shown in the drawings). The vibration of the troughs 120 by the vibration device causes the articles C that have dropped from the dispersion table 110 into the troughs 120 to move outward. In other words, the vibration of the troughs 120 by the vibration device moves articles C, that have dropped from the dispersion table 110 into the troughs 120, in the troughs 120 so as to away from the dispersion table 110. The articles C that have moved in the troughs 120 to outer edges thereof drop into the pool hoppers 130, which are disposed under the outer edge portions of the troughs 120 and are disposed in correspondence to the troughs 120.

(2-3) Pool Hoppers

Each of the plural pool hoppers 130 is disposed in correspondence to one of the plural troughs 120. Each pool hopper 130 is disposed under the outer edge portion of the corresponding trough 120. The pool hoppers 130 temporarily retain the articles C that drop thereto from the troughs 120. Discharge openings (not shown in the drawings) are formed in lower portions of the pool hoppers 130. Gates 130a that open and close the discharge openings of the pool hoppers 130 are provided in the discharge openings (see FIG. 3). When the gate 130a provided in the discharge opening of each pool hopper 130 opens, the articles C in that pool hopper 130 drop into the corresponding weigh hopper 140 disposed under that pool hopper 130.

(2-4) Weigh Hoppers

Each of the plural weigh hoppers 140 is disposed in correspondence to one of the plural pool hoppers 130. Each weigh hopper 140 is disposed under the corresponding pool hopper 130. The weigh hoppers 140 temporarily retain the articles C that drop thereto from the pool hoppers 130. Discharge openings (not shown in the drawings) are formed in lower portions of the weigh hoppers 140. Gates 140a that open and close the discharge openings of the weigh hoppers 140 are provided in the discharge openings (see FIG. 3). When the gate 140a provided in the discharge opening of each weigh hopper 140 opens, the articles C in that weigh hopper 140 drop to the collection chute 150 disposed under that weigh hopper 140.

Each of the plural weigh hoppers 140 is provided with a weight sensor 160. The weight sensor 160 is, for example, a load cell. Each weight sensor 160 weighs the weight of the articles C being retained in the weigh hopper 140 to which that weight sensor 160 is provided.

(2-5) Collection Chute

The collection chute 150 is a funnel-shaped member that guides, to the bag-making and packaging machine 200 disposed under the combination weighing machine 100, the articles C that drop thereto from the weigh hoppers 140.

(2-6) Controller

The controller 170 is a control device that includes a CPU, memories such as a ROM and a RAM, an input/output interface, and various peripheral circuits (not shown in the drawings). In this embodiment, the controller 170 is incorporated into the combination weighing machine 100. However, some or all of the functions of the controller 170 described below can also be realized by a control device separate from the combination weighing machine 100.

The controller 170 is electrically connected to the vibration device of the dispersion table 110, the vibration device of the troughs 120, the gates 130a, the gates 140a, and the weight sensors 160. Furthermore, the controller 170 of the combination weighing machine 100 is communicably connected to the controller 250 of the bag-making and packaging machine 200 that forms a pair with that combination weighing machine 100.

The controller 170 controls the actions of the respective parts of the combination weighing machine 100 by executing, with the CPU, programs stored in its memories. For example, the controller 170 activates the vibration device of the dispersion table 110 to vibrate the dispersion table 110 and to disperse and supply the articles C on the dispersion table 110 into the plural troughs 120 disposed around the dispersion table 110. Furthermore, the controller 170 activates the vibration device of the troughs 120 to vibrate the troughs 120 and to supply the articles C in the troughs 120 to the pool hoppers 130 corresponding to those troughs 120. Furthermore, the controller 170 opens the gates 130a provided in the discharge openings of the pool hoppers 130 to supply the articles C to the weigh hoppers 140 corresponding to each pool hopper 130. Furthermore, the controller 170 opens the gates 140a provided in the discharge openings of the weigh hoppers 140 to drop articles C into the collection chute 150.

Furthermore, the controller 170 performs a combination calculation of the articles C on the basis of the weight values that the weight sensors 160 weigh. The "combination calculation of the articles C" is a calculation for determining from which of the weigh hoppers 140 the articles C are to be dropped into the collection chute 150 when supplying the articles C from the combination weighing machine 100 to the bag-making and packaging machine 200. The combination calculation of the articles C and the supply of the articles with respect to the bag-making and packaging machine 200 are performed as follows, for example.

Each weight sensor 160 measures the weight of the articles C being retained in the weigh hopper 140 corresponding to that weight sensor 160. The controller 170 stores, in its memories (not shown in the drawings), the weight values of the articles C in the weigh hoppers 140 that have been measured by the weight sensors 160 so as to be able to identify which weigh hoppers 140 contain the articles C with those weight values. Then, the controller 170 uses the current weight values of the articles C in the weigh hoppers 140 to find, by calculation, a combination (called an optimum combination) of weights that is within the predetermined range with respect to the reference value and which is closest to the reference value out of the sum total of weights obtained by combining each of the weight values.

Then, when the optimum combination is obtained by the combination calculation, the controller 170 supplies the articles C to the bag-making and packaging machine 200 in response to an article request signal sent from the bag-making and packaging machine 200. Specifically, when it receives the article request signal from the bag-making and packaging machine 200, the controller 170 opens the gates 140a provided in the discharge openings of the weigh hoppers 140 that are associated with the weight values configuring the optimum combination and are stored in its memories. It will be noted that it is preferred that the controller 170 send, at the timing when it opens the gates 140a or a predetermined timing before or after it opens the gates 140a, a response signal to the bag-making and packaging machine 200 from which the article request signal was sent. By the controller 170 sending the response signal to the bag-making and packaging machine 200, the bag-making and packaging machine 200 can grasp the timing when the articles C drop thereto. When the gates 140a provided in the discharge openings of the weigh hoppers 140 open, the articles C in those weigh hoppers 140 are discharged into the collection chute 150. The articles C that have been discharged from the plural weigh hoppers 140 into the collection chute 150 are supplied to the bag-making and packaging machine 200 while they collect as they slide down the collection chute 150.

When the articles C are discharged from the weigh hoppers 140 and the weigh hoppers 140 become empty, the controller 170 activates the parts of the combination weighing machine 100 so that those weigh hoppers 140 are refilled with articles C. Then, the controller 170 again executes the combination calculation using the measurement values of the weight sensors 160 and supplies the articles C to the bag-making and packaging machine 200 in response to the article request signal sent from the bag-making and packaging machine 200.

Here, the controller 170 is described as controlling the actions of the combination weighing machine 100 and performing various calculations by executing, with the CPU of the controller 170, programs stored in its memories. However, in the controller 170, all or some of the control of the actions of the combination weighing machine 100 and/or the calculations may not be executed by the CPU, and all or some of the control of the actions of the combination weighing machine 100 and/or the calculations can be executed by hardware rather than software.

(2-7) Processing Capacity of Combination Weighing Machines

Next, the processing capacity of the combination weighing machines 100 will be described. Below, there will be cases where the processing capacity of the combination weighing machines 100 is called "combination weighing capacity." "Combination weighing capacity" means the processing speed of the combination weighing machines 100. Here, the combination weighing capacity is expressed by the number of times an article supply action is executed in a predetermined amount of time. Here, "article supply action" means the action of supplying the articles C to the bag-making and packaging machine 200 from the weigh hoppers 140 that are associated with the weight values configuring the optimum combination obtained by the combination calculation and are stored in the memories. The combination weighing capacity is expressed in units of "times/minute" for example.

In each combination weighing machine 100, the processable capacity is set to a maximum combination weighing capacity Wmax. Below, there will be cases where the processable capacity of the combination weighing machine 100 is called "combination-weighable capacity." "Combination-weighable capacity" represents the maximum number of times that the combination weighing machine 100 can execute the article supply action in the predetermined amount of time. It is noted that the combination-weighable capacity does not have to be the processing capacity that the combination weighing machine 100 can physically achieve. For example, the combination-weighable capacity can be the rated maximum processing capacity set by the manufacturer of the combination weighing machine 100.

The processing capacity of the combination weighing machine 100 that functions as a pair with the bag-making and packaging machine 200—namely, the processing speed at which the combination weighing machine 100 runs—is dependent on the frequency with which the bag-making and packaging machine 200 that forms a pair with the combination weighing machine 100 sends the article request signal. For example, in a case where the bag-making and packaging machine 200 sends the article request signal A-times in one minute, the processing capacity of the combination weighing machine 100 becomes A-times per minute which is same with the frequency with which the article request signal is sent. It will be noted that here a situation where the combination weighing machine 100 is unable to execute the article supply action in response to the article request signal due to a problem or the like is not supposed. In each weighing and packaging unit 300, the frequency with which the bag-making and packaging machine 200 sends the article request signal is set so as to not exceed the maximum combination weighing capacity Wmax.

It will be noted that in each combination weighing machine 100 it is preferred that the time in which the weight sensors 160 measure the weights of the articles C in the weigh hoppers 140 and the average time required for the combination calculation by the controller 170 remain the same even if the value of the combination weighing capacity changes. That is, in each combination weighing machine 100, it is preferred that the time for measurement by the weight sensors 160 and the average time required for the combination calculation by the controller 170 remain the same both when the combination weighing capacity is the maximum combination weighing capacity Wmax and when the combination weighing capacity is a value less than the maximum weighing capacity Wmax. It is thus preferred that when the combination weighing machine 100 runs at a combination weighing capacity lower than the maximum combination weighing capacity Wmax, the standby time of the combination weighing machine 100 be increased, compared to the standby time of the combination weighing machine 100 that runs at the maximum combination weighing capacity Wmax, in accordance with the difference in capacity with the maximum combination weighing capacity Wmax. By giving the combination weighing machines 100 this kind of configuration, even when the combination weighing capacity changes, the change can be accommodated without changing the settings of, for example, the processing speeds of the various mechanisms of the combination weighing machines 100.

(3) Configuration of Bag-Making and Packaging Machines

The bag-making and packaging machines 200 will now be described with reference to FIG. 4 in addition to FIG. 1 and FIG. 2. FIG. 4 is a drawing showing the schematic configuration of the bag-making and packaging machines 200. The description of the bag-making and packaging machines 200 described here holds true for both the bag-making and packaging machine 200A and the bag-making and packaging machine 200B.

In the following description, there will be cases where the expressions "front (front-facing)," "rear (back-facing)," "up," "down," "left," and "right" are used to describe directions and locations. Here, the directions "front (front-facing)," "rear (back-facing)," "up," "down," "left," and "right" are defined as shown in FIG. 4.

Each bag-making and packaging machine 200 mainly has a film supply mechanism (not shown in the drawings), a printing mechanism 205, a forming mechanism 210, conveyance mechanisms 220, a longitudinal sealing mechanism 230, a transverse sealing mechanism 240, a controller 250, and a capacity changing unit 252 (see FIG. 1 and FIG. 4). The film supply mechanism has a film roll (not shown in the drawings) to which sheet-like film F is wound. The forming mechanism 210 forms into a cylindrical shape the sheet-like film F that is paid out from the film roll of the film supply mechanism. The printing mechanism 205 is disposed on the conveyance path of the film F between the film roll and the forming mechanism 210. The printing mechanism 205 prints various types of information on the conveyed sheet-like film F in printing areas of the bags B that the bag-making and packaging machine 200 produces. The conveyance mechanisms 220 convey downward the film F that has been formed into the cylindrical shape by the forming mechanism 210 (hereinafter, the film F that has been formed into the cylindrical shape will be called "the cylindrical film Fc"). The longitudinal sealing mechanism 230 seals, in the longitudinal direction parallel to the conveyance direction of the cylindrical film Fc, the overlapping portion of the cylindrical film Fc. The transverse sealing mechanism 240 seals the cylindrical film Fc in two places in the direction orthogonal to the conveyance direction of the cylindrical film Fc to thereby form the bags B whose upper end portions and lower end portions have been transversely sealed. The controller 250 controls the actions of the various devices of the bag-making and packaging machine 200.

(3-1) Forming Mechanism

The forming mechanism 210 is a mechanism that forms into a cylindrical shape the sheet-like film F that is paid out from the film roll of the film supply mechanism. As shown in FIG. 4, the forming mechanism 210 mainly has a tube 210a and a former 210b. The tube 210a is a cylindrical member that extends in the up and down direction. Upper and lower ends of the tube 210a are open. The former 210b is disposed so as to surround the outer periphery of the tube 210a. The sheet-like film F that is paid out from the film supply mechanism becomes wrapped around the outer surface of tube 210a and formed into the cylindrical shape while passing through a gap between the former 210b and the tube 210a. In other words, the former 210b forms the cylindrical film Fc from the sheet-like film F that is delivered from the film supply mechanism. The articles C that drop from the combination weighing machine 100 above the bag-making and packaging machine 200 are input from the opening in the upper end of the tube 210a and fall from the opening in the lower end of the tube 210a into the cylindrical film Fc that the former 210b forms.

(3-2) Conveyance Mechanisms

The conveyance mechanisms 220 are mechanisms that convey downward the film F that has been formed into the cylindrical shape (the cylindrical film Fc). The conveyance mechanisms 220 have a pair of endless conveyor belts 222. Each of the conveyor belts 222 is entrained about a drive roller 224a and a follower roller 224b. The pair of endless belts 222 are disposed on the right and left sides of the tube 210a so as to sandwich the tube 210a. The pair of conveyor belts 222 contact the film F that is wrapped around the tube 210a. The conveyor belts 222 have a suction function and suck hold of the film F contacting the conveyor belts 222. When motors (not shown in the drawings) coupled to the drive rollers 224a run and the conveyor belts 222 are rotated by the drive rollers 224a and the follower rollers 224b in a state in which the pair of conveyor belts 222 suck hold the film F, the cylindrical film Fc wrapped around the tube 210a is conveyed downward.

(3-3) Longitudinal Sealing Mechanism

The longitudinal sealing mechanism 230 is a mechanism that seals the cylindrical film Fc in the longitudinal direction along the conveyance direction of the cylindrical film Fc. The longitudinal sealing mechanism 230 is disposed on the front side of the tube 210a where the overlapping portion of the cylindrical film Fc is disposed. The longitudinal sealing mechanism 230 mainly has a heater, a heater belt, and a drive mechanism (not shown in the drawings). The heater heats the heater belt. The drive mechanism causes the heater belt to move in forward and backward directions toward the tube 210a or away from the tube 210a. When the drive mechanism causes the heater belt to move toward the tube 210a, the overlapping portion in the longitudinal direction of the cylindrical film Fc wrapped around the tube 210a becomes sandwiched between the heater belt and the tube 210a. The overlapping portion of the cylindrical film Fc is heat-sealed as a result of the heater belt heated by the heater sandwiching the overlapping portion of the cylindrical film Fc between itself and the tube 210a.

(3-4) Transverse Sealing Mechanism

The transverse sealing mechanism 240 is disposed under the tube 210a and the longitudinal sealing mechanism 230. The transverse sealing mechanism 240 is a mechanism that seals, in the transverse direction orthogonal to the conveyance direction of the cylindrical film Fc, the cylindrical film Fc that has been longitudinally sealed by the longitudinal sealing mechanism 230 to thereby produce the bags B. The transverse sealing mechanism 240 has a pair of sealing jaws 242 and a drive mechanism (not shown in the drawings). The sealing jaws 242 each have a heater and a sealing surface that is heated by the heater (not shown in the drawings). Furthermore, one of the pair of sealing jaws 242 has a built-in cutter (not shown in the drawings). The drive mechanism causes the pair of sealing jaws 242 to move in forward and backward directions toward or away from each other.

In the transverse sealing mechanism 240, the pair of sealing jaws 242 are driven by the drive mechanism to approach each other at a predetermined timing. When the pair of sealing jaws 242 move toward each other, the sealing surfaces of the pair of sealing jaws 242 sandwich the cylindrical film Fc between themselves. The portion of the cylindrical film Fc sandwiched by the sealing surfaces of the sealing jaws 242 is heat-sealed in the transverse direction by the sealing surfaces of the sealing jaws 242. Here, the portion that has been heat-sealed by the sealing jaws 242 will be called "the transversely sealed portion." When the sealing surfaces of the pair of sealing jaws 242 sandwich the cylindrical film Fc, the cutter built into one of the sealing jaws 242 cuts the transversely sealed portion in the transverse direction to thereby cut away the bag B below from the subsequent cylindrical film Fc.

(3-5) Printing Mechanism

The printing mechanism 205 is disposed adjacent to the conveyance path of the film F between the film supply mechanism and the forming mechanism 210. The printing mechanism 205 prints various types of information on the sheet-like film F in positions corresponding to printing areas of the bags B that the bag-making and packaging machine 200 produces. The various types of information include the date of manufacture for example. The printing mechanism 205 mainly has a print head 205a. The print head 205a reciprocally moves between a basic position, at which it maintains a certain distance from the film F, and a printing position, at which it contacts the film F. When the print head 205a is in the printing position, it prints the various types of information on the film F. The timing when the print head 205a moves from the basic position to the printing position is controlled by the controller 250 so that the print head 205a contacts appropriate places (the printing areas) on the film F when the print head 205 is in the printing position.

(3-6) Controller

The controller 250 is a control device that includes a CPU, memories such as a ROM and a RAM, an input/output interface, and various peripheral circuits (not shown in the drawings). In this embodiment, the controller 250 is incorporated into the bag-making and packaging machine 200. However, some or all of the functions of the controller 250 described below can also be realized by a control device separate from the bag-making and packaging machine 200.

The controller 250 is electrically connected to the film supply mechanism (not shown in the drawings), the conveyance mechanisms 220, the longitudinal sealing mechanism 230, the transverse sealing mechanism 240, and the printing mechanism 205. Furthermore, the controller 250 of the bag-making and packaging machine 200 is communicably connected to the controller 170 of the combination weighing machine 100 that forms a pair with that bag-making and packaging machine 200. Furthermore, the controller 250 of the bag-making and packaging machine 200 is connected to various sensors (not shown in the drawings) provided in the bag-making and packaging machine 200. The various sensors include, for example, a sensor that detects a using up of the film of the film roll, a sensor that detects a problem where the film F is not supplied to the transverse sealing mechanism 240, and a sensor (a camera or the like) that detects the position at which printing is performed by the printing mechanism 205, though this is not intended to limit the sensor types.

The controller 250 controls the actions of the respective parts of the bag-making and packaging machine 200 by executing, with the CPU, programs stored in its memories. For example, the controller 250 controls the film supply mechanism so that the film F is supplied to the forming mechanism 210 at appropriate timings. Furthermore, the controller 250 controls the conveyance mechanisms 220 so that the film F that has been formed into the cylindrical shape by the forming mechanism 210 (the cylindrical film Fc) is conveyed downward at appropriate timings. Furthermore, the controller 250 controls the longitudinal sealing mechanism 230 so that the overlapping portion of both end portions of the cylindrical film Fc conveyed downward is sealed in the longitudinal direction. Furthermore, the controller 250 sends the article request signal to the combination weighing machine 100 at appropriate timings. Furthermore, the controller 250 controls the transverse sealing mechanism 240 so that the cylindrical film Fc is transversely sealed at the timings when the articles C supplied by the combination weighing machine 100 reach the neighborhood of the lower end of the cylindrical film Fc and the bag B that has been sealed is cut away from the upstream cylindrical film Fc. The controller 250 decides the timings to activate the transverse sealing mechanism 240 utilizing the response signal sent from the combination weighing machine 100.

The bag-making and packaging machine 200 of this embodiment runs not in a continuous operating mode but in an intermittent operating mode.

Here, "continuous operating mode" means an operating mode of the bag-making and packaging machine 200 in which the film F is conveyed generally continuously. That is, when the bag-making and packaging machine 200 runs in the continuous operating mode, the conveyance mechanisms 220 convey the film F (including the cylindrical film Fc) continuously. Furthermore, when the bag-making and packaging machine 200 runs in the continuous operating mode, the longitudinal sealing mechanism 230 longitudinally seals the cylindrical film Fc generally continuously. On the other hand, "intermittent operating mode" means an operating mode of the bag-making and packaging machine 200 in which the film F is conveyed intermittently. That is, when the bag-making and packaging machine 200 of this embodiment runs in the intermittent operating mode, the controller 250 frequently switches between running the conveyance mechanisms 220 and interrupting the running of the conveyance mechanisms 220 (placing them on standby). Furthermore, when the bag-making and packaging machine 200 of this embodiment runs in the intermittent operating mode, the controller 250 frequently switches between having the longitudinal sealing mechanism 230 execute the longitudinal sealing and interrupting the execution of the longitudinal sealing by the longitudinal sealing mechanism 230.

Here, the controller 250 is described as controlling the actions of the bag-making and packaging machine 200 by executing, with the CPU of the controller 250, programs stored in its memories. However, in the controller 250, all or some of the control of the actions of the bag-making and packaging machine 200 may not be executed by the CPU, and all or some of the control of the actions of the bag-making and packaging machine 200 can be executed by hardware rather than software.

(3-7) Capacity Changing Units

The capacity changing units 252 are an example of a control unit.

In a case where a problem is occurring in at least one of the weighing by the combination weighing machine 100 and the packaging by the bag-making and packaging machine 200 in any of the weighing and packaging units 300, the capacity changing units 252 change the processing capacities of the combination weighing machine 100 and the bag-making and packaging machine 200 of at least some of the weighing and packaging units 300 other than the weighing and packaging unit 300 in which the problem is occurring. Specifically, in a case where a problem is occurring in at least one of the weighing by the combination weighing machine 100A and the packaging by the bag-making and packaging machine 200A in the weighing and packaging unit 300A, the capacity changing unit 252 of the bag-making and packaging machine 200A changes the processing capacities of the combination weighing machine 100B and the bag-making and packaging machine 200B of the weighing and packaging unit 300B other than the weighing and packaging unit 300A in which the problem is occurring. Furthermore, in a case where a problem is occurring in at least one of the weighing by the combination weighing machine 100B and the packaging by the bag-making and packaging machine 200B in the weighing and packaging unit 300B, the capacity changing unit 252 of the bag-making and packaging machine 200B changes the processing capacities of the combination weighing machine 100A and the bag-making and packaging machine 200A of the weighing and packaging unit 300A other than the weighing and packaging unit 300B in which the problem is occurring.

Here, the capacity changing units 252 and the controller 250 are separately described. However, the capacity changing units 252 can be configured as part of the controllers 250. The capacity changing units 252 can be devices separate from the controllers 250.

Details of the capacity changing units 252 will be described later.

(3-8) Processing Capacity of Bag-Making and Packaging Machines

Next, the processing capacity of the bag-making and packaging machines 200 will be described. Below, there will be cases where the processing capacity of the bag-making and packaging machines 200 is called "packaging capacity."

"Packaging capacity" means the processing speed of the bag-making and packaging machines 200. Specifically, the processing capacity is expressed by the number of bags B containing the predetermined quantity of the articles C made by the bag-making and packaging machine 200 in a predetermined amount of time. The processing capacity is expressed in units of "bags/minute" for example.

In each bag-making and packaging machine 200, the processable capacity is set to a maximum packaging capacity Pmax. Below, there will be cases where the processable capacity of the bag-making and packaging machine 200 is called "packageable capacity." "Packageable capacity" represents the maximum number of bags B that the bag-making and packaging machine 200 can make in the predetermined amount of time. It is noted that the packageable capacity does not have to be the processing capacity that the bag-making and packaging machine 200 can physically achieve. For example, the packageable capacity can be the rated maximum processing capacity set by the manufacturer of the bag-making and packaging machine 200.

During normal operation, the controller 250 controls the actions of the respective parts of the bag-making and packaging machine 200 so that the bag-making and packaging machine 200 runs at the processing capacity instructed by the operator of the weighing and packaging system 1000 (hereinafter called a first packaging capacity P1). Furthermore, the controller 250 sends, at a frequency corresponding to the first packaging capacity P1, the article request signal to the combination weighing machine 100 with which that bag-making and packaging machine 200 forms a pair. Specifically, supposing that the first packaging capacity P1 is A<bags/minute>, the controller 250 sends the article request signal to the combination weighing machine 100 A-times in one minute.

The operator instructs the controller 250 about the packaging capacity that the bag-making and packaging machine 200 should achieve by, for example, inputting the first packaging capacity P1 to the liquid crystal display 500 of the weighing and packaging unit 300. It will be noted that the first packaging capacity P1 is a value less than the maximum packaging capacity Pmax. Furthermore, the first packaging capacity P1 is set so that the frequency with which the bag-making and packaging machine 200 sends the article request signal does not exceed the maximum combination weighing capacity Wmax of the combination weighing machine 100. For example, if the maximum packaging capacity Pmax is 120 bags/minute, the first packaging capacity P1 is 80 bags/minute, though this is not intended to limit the numerical values of the packaging capacities.

Furthermore, when, while its own bag-making and packaging machine 200 is running, the controller 250 receives an instruction to change the processing capacity from the capacity changing unit 252 of another bag-making and packaging machine 200, the controller 250 changes the processing capacity of the bag-making and packaging machine 200 from the first packaging capacity P1. Specifically, when the controller 250 of the bag-making and packaging machine 200A receives an instruction to change the processing capacity from the capacity changing unit 252 of the bag-making and packaging machine 200B, it changes the processing capacity of the bag-making and packaging machine 200A from the first packaging capacity P1 to a second packaging capacity P2. Furthermore, when the controller 250 of the bag-making and packaging machine 200B receives an instruction to change the processing capacity from the capacity changing unit 252 of the bag-making and packaging machine 200A, it changes the processing capacity of the bag-making and packaging machine 200B from the first packaging capacity P1 to the second packaging capacity P2.

The second packaging capacity P2 is a value greater than the first packaging capacity P1 and equal to or less than the maximum packaging capacity Pmax. Furthermore, it is preferred that the second packaging capacity P2 be set so that the frequency with which the bag-making and packaging machine 200 sends the article request signal does not exceed the maximum combination weighing capacity Wmax of the combination weighing machine 100. For example, if the maximum packaging capacity Pmax is 120 bags/minute and the first packaging capacity P1 is 80 bags/minute, the second packaging capacity P2 is 120 bags/minute, though this is not intended to limit the numerical values of the packaging capacities.

It is preferred that the speeds of the various mechanisms of the bag-making and packaging machine 200 is same both when the bag-making and packaging machine 200 runs at the first packaging capacity P1 and when it runs at the second packaging capacity P2. The speeds of the various mechanisms include, for example, the printing speed of the printing device 205, the speed at which the film F is conveyed by the conveyance mechanisms 220, and the time in which the transverse sealing is performed by the transverse sealing mechanism 240. Additionally, in the bag-making and packaging machine 200, it is preferred that the changing of the processing capacity be performed by increasing the standby time (the standby time in which the conveyance mechanisms 220 do not convey the film F) when the bag-making and packaging machine 200 runs at the first packaging capacity P1 compared to the standby time of the bag-making and packaging machine 200 that runs at the second packaging capacity P2.

More preferably, it is preferred that the speeds of the various mechanisms of the bag-making and packaging machine 200 remain the same regardless of the value of the packaging capacity. That is, when the bag-making and packaging machine 200 runs at a packaging capacity lower than the maximum packaging capacity Pmax, it is preferred that the standby time be appropriately increased compared to the standby time of the bag-making and packaging machine 200 that runs at the maximum packaging capacity Pmax.

(4) Changing of Processing Capacities of Bag-Making and Packaging Machines and Combination Weighing Machines by Capacity Changing Units The changing of the processing capacities of the bag-making and packaging machines 200 and the combination weighing machines 100 by the capacity changing units 252 of the bag-making and packaging machines 200 will be described.

In particular, here, a case where the capacity changing unit 252 of the bag-making and packaging machine 200A changes the processing capacities of the bag-making and packaging machine 200B and the combination weighing machine 100B of the weighing and packaging unit 300B will be described as an example. To simply description, the controller 170 of the combination weighing machine 100A will be denoted by reference sign 170A, the controller 170 of the combination weighing machine 100B will be denoted by reference sign 170B, the controller 250 of the bag-making and packaging machine 200A will be denoted by reference sign 250A, and the controller 250 of the bag-making and packaging machine 200B will be denoted by reference sign 250B.

It will be noted that, regarding the changing of the processing capacities of the bag-making and packaging machine 200A and the combination weighing machine 100A of the weighing and packaging unit 300A by the capacity changing unit 252 of the bag-making and packaging machine 200B, it suffices, in the following description, to replace the content relating to the bag-making and packaging machine 200A with content relating to the bag-making and packaging machine 200B, replace the content relating to the bag-making and packaging machine 200B with content relating to the bag-making and packaging machine 200A, replace the content relating to the combination weighing machine 100A with content relating to the combination weighing machine 100B, and replace the content relating to the combination weighing machine 100B with content relating to the combination weighing machine 100A. Here, to avoid redundant description, detailed description regarding the changing of the processing capacities of the bag-making and packaging machine 200A and the combination weighing machine 100A of the weighing and packaging unit 300A by the capacity changing unit 252 of the bag-making and packaging machine 200B will be omitted.

Here, as a premise of the description, it is supposed, as described above, that the packaging capacity during normal operation of the bag-making and packaging machine 200A and the bag-making and packaging machine 200B is the first packaging capacity P1. Furthermore, it is supposed that the processing capacity of the bag-making and packaging machine 200B after receiving the instruction to change its processing capacity from the capacity changing unit 252 of the bag-making and packaging machine 200A is the second packaging capacity P2.

Moreover, as a premise of the description, it is supposed that the bag-making and packaging machine 200A and the bag-making and packaging machine 200B are communicably connected to each other by a communication line S. Here, it is supposed that the communication line S is a physical communication line. However, unless otherwise specified, the bag-making and packaging machine 200A and the bag-making and packaging machine 200B can also be communicably connected to each other wirelessly.

The capacity changing unit 252 of the bag-making and packaging machine 200A sends a predetermined signal to the controller 250B of the bag-making and packaging machine 200B via the communication line S. What kind of signal the predetermined signal is will be described later. The capacity changing unit 252 of the bag-making and packaging machine 200A utilizes the predetermined signal to instruct a change in the processing capacities of the combination weighing machine 100B and the bag-making and packaging machine 200B of the weighing and packaging unit 300B. Specifically, the capacity changing unit 252 of the bag-making and packaging machine 200A utilizes the predetermined signal to instruct an increase in the processing capacities of the combination weighing machine 100B and the bag-making and packaging machine 200B of the weighing and packaging unit 300B.

In a case where a problem is occurring in at least one of the weighing by the combination weighing machine 100A and the packaging by the bag-making and packaging machine 200A in the weighing and packaging unit 300A, the capacity changing unit 252 of the bag-making and packaging machine 200A instructs the change in the processing capacities of the combination weighing machine 100B and the bag-making and packaging machine 200B of the weighing and packaging unit 300B (hereinafter there will be cases where, to simplify description, this is called a change in the processing capacity of the weighing and packaging unit 300B). More specifically, in a case where the controller 250A has detected that a problem is occurring in at least one of the weighing by the combination weighing machine 100A and the packaging by the bag-making and packaging machine 200A, the capacity changing unit 252 of the bag-making and packaging machine 200A instructs the change in the processing capacity of the weighing and packaging unit 300B.

States in which a problem is occurring in the weighing by the combination weighing machine 100A include a state in which the articles C are unable to be supplied for some reason from the combination weighing machine 100A to the bag-making and packaging machine 200A. A state in which the articles C are unable to be supplied from the combination weighing machine 100A can occur when, for example, the articles C are not physically supplied to the weigh hoppers 140. Furthermore, a state in which the articles C are unable to be supplied from the combination weighing machine 100A can occur when, even if the combination calculation is performed, a combination of weight values that falls in the predetermined range with respect to the reference value cannot be found. Furthermore, states in which a problem is occurring in the weighing by the combination weighing machine 100A can also include a state in which the articles C are able to be supplied to the bag-making and packaging machine 200A but the articles C are unable to be supplied for some reason to the weigh hoppers 140 at a frequency corresponding to the first packaging capacity P1. In other words, states in which a problem is occurring in the weighing by the combination weighing machine 100A can also include a state in which the articles C are unable to be supplied to the bag-making and packaging machine 200A (a problem state in a narrow sense) and a state in which the processing capacity of the combination weighing machine 100A has been reduced for some reason and the articles C are unable to be supplied at the frequency required by the bag-making and packaging machine 200A (a problem state in a wide sense).

The controller 250A detects the state in which a problem is occurring in the weighing by the combination weighing machine 100A in the following way, for example. As mentioned above, the controller 250A is configured to receive the response signal that the controller 170A sends when the combination weighing machine 100A discharges the articles C in response to the article request signal that the controller 250A sends. The controller 250A detects that a problem is occurring in the weighing by the combination weighing machine 100A in a case where the response signal is not sent in response to the article request signal and a case where the reception of the response signal is delayed a predetermined amount of time or more with respect to the article request signal. However, the controller 250A can also detect, by another method, a problem in the weighing by the combination weighing machine 100A. For example, the controller 170A of the combination weighing machine 100A can also be configured to detect, on the basis of detection results of various sensors (not shown in the drawings) provided in the combination weighing machine 100A, that a problem is occurring in the weighing by the combination weighing machine 100A and send to the bag-making and packaging machine 200A a problem occurrence signal when a problem occurs. Then, on the basis of receiving the problem occurrence signal that the controller 170A sends, the controller 250A can detect that a problem is occurring in the weighing by the combination weighing machine 100A. Furthermore, the controller 250A can also detect, on the basis of images from cameras (not shown in the drawings) that capture images of the combination weighing machine 100A or measurement values of the sensors (not shown in the drawings) provided in the combination weighing machine 100A, that a problem is occurring in the weighing by the combination weighing machine 100A.

States in which a problem is occurring in the packaging by the bag-making and packaging machine 200A include, for example, a using up of the film of the film roll of the film supply mechanism, a shift in the position of the printing by the printing mechanism 205, and the occurrence of a state in which the cylindrical film Fc is not supplied to the transverse sealing mechanism 240. The controller 250A detects, on the basis of detection results of the sensors (not shown in the drawings) provided in the bag-making and packaging machine 200A, for example, that a problem is occurring in the packaging by the bag-making and packaging machine 200A.

Next, example implementations of the configuration and actions of the capacity changing unit 252 of the bag-making and packaging machine 200A will be described.

(A) Example Implementation 1

In this example implementation, the weighing and packaging units 300A, 300B are interconnected by physical communication lines S (signal lines). The communication lines S are utilized to send contact signals. In this example implementation, the capacity changing unit 252 of the bag-making and packaging machine 200A is a transmission unit that sends the contact signal. The capacity changing units 252 can include relays and the like, for example. The capacity changing unit 252 of the bag-making and packaging machine 200A sends the contact signal via a physical communication line S (signal line). The capacity changing unit 252 of the bag-making and packaging machine 200B can send the contact signal via another physical communication line S. The capacity changing unit 252 of the bag-making and packaging machine 200A sends the contact signal when the bag-making and packaging machine 200A is operating and does not send the contact signal when the bag-making and packaging machine 200A stops. In other words, the capacity changing unit 252 of the bag-making and packaging machine 200A does not send the contact signal when a problem occurs in at least one of the weighing by the combination weighing machine 100A and the packaging by the bag-making and packaging machine 200A and the operation of the bag-making and packaging machine 200A stops. It will be noted that the reason the operation of the bag-making and packaging machine 200A stops in a case where a problem has occurred in the weighing by the combination weighing machine 100A is, the articles C are no longer supplied to the bag-making and packaging machine 200A, and the bag-making and packaging machine 200A is no longer able to make the bags containing the articles C.

In this example implementation, the controller 250B is designed to change the processing capacity of the bag-making and packaging machine 200B from the first packaging capacity P1 to the second packaging capacity P2 when the bag-making and packaging machine 200B is operating and the contact signal sent from the capacity changing unit 252 of the bag-making and packaging machine 200A is not input. For that reason, here, in a case where a problem is occurring in at least one of the weighing by the combination weighing machine 100A and the packaging by the bag-making and packaging machine 200A, the processing capacity of the bag-making and packaging machine 200B is changed from the first packaging capacity P1 to the second packaging capacity P2. Furthermore, when the processing capacity of the bag-making and packaging machine 200B is changed from the first packaging capacity P1 to the second packaging capacity P2, the processing capacity of the combination weighing machine 100B is also changed from the combination weighing capacity corresponding to the first packaging capacity P1 to the combination weighing capacity corresponding to the second packaging capacity P2.

That is, in this example implementation, the capacity changing unit 252 of the bag-making and packaging machine 200A changes the processing capacities of the combination weighing machine 100B and the bag-making and packaging machine 200B in a case where a problem is occurring in at least one of the weighing by the combination weighing machine 100A and the packaging by the bag-making and packaging machine 200A.

Furthermore, in this example implementation, the capacity changing unit 252 of the bag-making and packaging machine 200A notifies the weighing and packaging unit 300B, as an instruction to change the processing capacities of the combination weighing machine 100B and the bag-making and packaging machine 200B, that at least one of the combination weighing machine 100A and the bag-making and packaging machine 200A has stopped in the weighing and packaging unit 300A in which the problem is occurring.

Furthermore, the capacity changing unit 252 of the bag-making and packaging machine 200A utilizes the contact signal for the instruction to change the processing capacities of the combination weighing machine 100B and the bag-making and packaging machine 200B. The contact signal here is a signal that notifies whether or not the bag-making and packaging machine 200A is operating. In this way, by utilizing the contact signal, when a problem occurs in the weighing and packaging unit 300A, the processing capacity of the other weighing and packaging unit 300B can be changed by simply interconnecting the weighing and packaging units 300A, 300B with the communication lines S and without using a complicated control device.

It will be noted that in this example implementation, in a case where a problem is occurring in at least one of the weighing by the combination weighing machine 100A and the packaging by the bag-making and packaging machine 200A, the capacity changing unit 252 of the bag-making and packaging machine 200A changes the processing capacities of the combination weighing machine 100B and the bag-making and packaging machine 200B by interrupting the sending of the contact signal. Instead of this, in a case where a problem is occurring in at least one of the weighing by the combination weighing machine 100A and the packaging by the bag-making and packaging machine 200A, the capacity changing unit 252 of the bag-making and packaging machine 200A can change the processing capacities of the combination weighing machine 100B and the bag-making and packaging machine 200B by sending the contact signal. For example, the contact signal here is a signal that is sent when the bag-making and packaging machine 200A has stopped. In this case, in a case where a problem is not occurring in either the weighing by the combination weighing machine 100A or the packaging by the bag-making and packaging machine 200A (when they are normal), the capacity changing unit 252 of the bag-making and packaging machine 200A does not send the contact signal. In this case, it suffices for the controller 250B to be designed to change the processing capacity of the bag-making and packaging machine 200B from the first packaging capacity P1 to the second packaging capacity P2 when the bag-making and packaging machine 200B is operating and the contact signal is input.

(B) Example Implementation 2

In this example implementation, part of the controller 250A functions as the capacity changing unit 252.

In this example implementation, the capacity changing unit 252 of the bag-making and packaging machine 200A is a signal transmission unit that sends, to the controller 250B via the communication line S, a change command instructing that the processing capacity be changed to the second packaging capacity P2. The capacity changing unit 252 of the controller 250A sends the change command in a case where a problem is occurring in at least one of the weighing by the combination weighing machine 100A and the packaging by the bag-making and packaging machine 200A. It will be noted that here the controller 250B is designed to change the processing capacity of the bag-making and packaging machine 200B from the first packaging capacity P1 to the second packaging capacity P2 in accordance with the change command that the capacity changing unit 252 of the bag-making and packaging machine 200A sends.

That is, in this example implementation, in a case where a problem is occurring in at least one of the weighing by the combination weighing machine 100A and the packaging by the bag-making and packaging machine 200A, the capacity changing unit 252 of the controller 250A changes the processing capacities of the combination weighing machine 100B and the bag-making and packaging machine 200B by sending the change command.

It will be noted that the capacity changing unit 252 of the controller 250A can send the change command only in a case where at least one of the combination weighing machine 100A and the bag-making and packaging machine 200A has stopped in the weighing and packaging unit 300A in which the problem is occurring. Furthermore, the capacity changing unit 252 of the controller 250A can send the change command also in a case where the processing capacity of the weighing and packaging unit 300A in which the problem is occurring has been reduced (the packaging capacity of the bag-making and packaging machine 200A has become lower than the first packaging capacity P1).

In this example implementation part of the controller 250A functions as the capacity changing unit 252, the capacity changing unit 252 is not limited to such a configuration. The capacity changing unit 252 can also be a control device that is communicably connected to the controller 250A.

Furthermore, in this example implementation, it is supposed that the packaging capacity of the bag-making and packaging machine 200B is changed to the same second packaging capacity P2 both in a case where the weighing and packaging unit 300A has stopped and in a case where the processing capacity of the weighing and packaging unit 300A has been reduced. However, instead of this, the capacity changing unit 252 of the controller 250A can send a change command instructing that the processing capacity be changed to the second packaging capacity P2 in a case where the weighing and packaging unit 300A has stopped and send a change command instructing that the processing capacity be changed to a third packaging capacity in a case where the processing capacity of the weighing and packaging unit 300A has been reduced (a case where the weighing and packaging unit 300A has not stopped). It is preferred that the third packaging capacity be a value greater than the first packaging capacity and less than the second packaging capacity P2.

It will be noted that the change command that the capacity changing unit 252 of the controller 250A sends is, for example. a command that directly instructs a change in processing capacity.

Furthermore, the change command that the capacity changing unit 252 of the controller 250A sends can also be a signal that notifies the weighing and packaging unit 300B that is to be instructed to change its processing capacity that at least one of the combination weighing machine 100A and the bag-making and packaging machine 200A has stopped in the weighing and packaging unit 300A in which the problem is occurring. It will be noted that in this case it suffices for the controller 250B to be designed to change the packaging capacity of the bag-making and packaging machine 200B from the first packaging capacity P1 to the second packaging capacity P2 in a case where the bag-making and packaging machine 200B is operating and the signal that indicates that at least one of the combination weighing machine 100A and the bag-making and packaging machine 200A has stopped has been input.

(5) Characteristics

5-1

The weighing and packaging system 1000 pertaining to the above embodiment has the plural combination weighing machines 100 (100A, 100B), the plural bag-making and packaging machines 200 (200A, 200B), and the capacity changing unit 252. The combination weighing machines 100 are an example of weighing machines. The bag-making and packaging machines 200 are an example of packaging machines. The capacity changing unit 252 is an example of a control unit. The combination weighing machines 100 weigh the articles C that are supplied thereto. The bag-making and packaging machine 200A configures the weighing and packaging unit 300A with the combination weighing machine 100A with which it forms a pair out of the plural combination weighing machines 100A, 100B. The bag-making and packaging machine 200B configures the weighing and packaging unit 300B with the combination weighing machine 100B with which it forms a pair out of the plural combination weighing machines 100A, 100B. Each of the plural bag-making and packaging machines 200 receives the supply of the articles C that are weighed and discharged by the combination weighing machine 100 with which it forms a pair and packages the articles C that are supplied thereto.

In a case where a problem is occurring in at least one of the weighing by the combination weighing machine 100 and the packaging by the bag-making and packaging machine 200 in any of the weighing and packaging units 300, the capacity changing unit 252 changes the processing capacities of the combination weighing machine 100 and the bag-making and packaging machine 200 of at least some of the weighing and packaging units 300 other than the weighing and packaging unit 300 in which the problem is occurring.

Specifically, in this embodiment, in a case where a problem is occurring in at least one of the weighing by the combination weighing machine 100A and the packaging by the bag-making and packaging machine 200A in the weighing and packaging unit 300A, the capacity changing unit 252 of the bag-making and packaging machine 200A changes the processing capacities of the combination weighing machine 100B and the bag-making and packaging machine 200B of the weighing and packaging unit 300B other than the weighing and packaging unit 300A in which the problem is occurring. Furthermore, for example, in a case where a problem is occurring in at least one of the weighing by the combination weighing machine 100B and the packaging by the bag-making and packaging machine 200B in the weighing and packaging unit 300B, the capacity changing unit 252 of the bag-making and packaging machine 200B changes the processing capacities of the combination weighing machine 100A and the bag-making and packaging machine 200A of the weighing and packaging unit 300A other than the weighing and packaging unit 300B in which the problem is occurring.

In this weighing and packaging system 1000, in a case where a problem is occurring in any of the plural weighing and packaging units 300, the processing capacities of the weighing and the packaging are changed in the weighing and packaging units 300 other than the weighing and packaging unit 300 in which the problem is occurring. For that reason, a reduction in the processing capacity of the weighing and packaging system 1000 caused by a problem in some of the weighing and packaging units 300 can be reduced.

With this weighing and packaging system 1000, the following advantage is also obtained.

There are cases where it is difficult to flexibly change the supply quantity of the articles C that are conveyed to the weighing and packaging system 1000 by the first conveyor 10 located upstream. For example, there are cases where the processing capacity of the manufacturing device cannot be easily changed when the first conveyor 10 successively conveys the articles C, which a manufacturing device disposed upstream of the weighing and packaging system 1000 manufactures.

In such situations, in a case where a weighing and packaging system not configured as in this embodiment is employed, retention equipment that temporarily retain oversupplied articles, that is caused by a reduction in the processing capacity of the weighing and packaging system, may be necessary. It will be noted that "weighing and packaging system not configured as in this embodiment" means a weighing and packaging system where, even in a case where a problem is occurring in any of the weighing and packaging units, the processing capacities of the weighing and the packaging are not changed in the other weighing and packaging units.

In contrast, in a case where the weighing and packaging system 1000 of this embodiment is employed, the retention equipment can be dispensed with or the retention equipment can be downsized.

5-2

In the weighing and packaging system 1000 pertaining to this embodiment, the capacity changing unit 252 is installed in at least any of the plural weighing and packaging units 300. In the above embodiment, the capacity changing unit 252 is installed in both of the weighing and packaging units 300A, 300B.

In this weighing and packaging system 1000, when a problem occurs in some of the plural weighing and packaging units 300, the processing capacities of the other weighing and packaging units 300 can be changed with a relatively simple and inexpensive configuration.

(5-3)

In the weighing and packaging system 1000 pertaining to an example of this embodiment, the capacity changing unit 252 notifies the weighing and packaging unit 300 that is to be instructed to change its processing capacity, as an instruction to change the processing capacities of the combination weighing machine 100 and the bag-making and packaging machine 200, that at least one of the combination weighing machine 100 and the bag-making and packaging machine 200 is stopped in the weighing and packaging unit 300 in which the problem is occurring.

Specifically, in an example of this embodiment, the capacity changing unit 252 of the bag-making and packaging machine 200A notifies the weighing and packaging unit 300B that is to be instructed to change its processing capacity, as an instruction to change the processing capacities of the combination weighing machine 100B and the bag-making and packaging machine 200B, that at least one of the combination weighing machine 100A and the bag-making and packaging machine 200A is stopped in the weighing and packaging unit 300A in which the problem is occurring. Furthermore, the capacity changing unit 252 of the bag-making and packaging machine 200B notifies the weighing and packaging unit 300A that is to be instructed to change its processing capacity, as an instruction to change the processing capacities of the combination weighing machine 100A and the bag-making and packaging machine 200A, that at least one of the combination weighing machine 100B and the bag-making and packaging machine 200B is stopped in the weighing and packaging unit 300B in which the problem is occurring.

In this weighing and packaging system 1000, when a problem occurs in any of the weighing and packaging units 300, the capacity changing unit 252 does not produce a special command but simply indicates that the combination weighing machine 100 and/or the bag-making and packaging machine 200 is stopped to change the processing capacities of the other weighing and packaging units 300. For that reason, in this weighing and packaging system 1000, when a problem occurs in some of the plural weighing and packaging units 300, the processing capacities of the other weighing and packaging units 300 can be changed with a relatively simple and inexpensive configuration.

5-4

In the weighing and packaging system 1000 pertaining to an example of this embodiment, the capacity changing unit 252 sends, via the physical communication line S, an instruction to change the processing capacities of the combination weighing machine 100 and the bag-making and packaging machine 200.

In the weighing and packaging system 1000, the instruction to change the processing capacities is sent by the physical communication line S. For that reason, in the weighing and packaging system 1000, in a case where a problem is occurring in any of the weighing and packaging units 300, the processing capacities of the combination weighing machine 100 and the bag-making and packaging machine 200 can be reliably changed in at least some of the other weighing and packaging units 300.

5-5

In the weighing and packaging system 1000 pertaining to an example of this embodiment, the capacity changing unit 252 utilizes a contact signal for the instruction to change the processing capacities of the combination weighing machine 100 and the bag-making and packaging machine 200.

Specifically, in an example of this embodiment, the capacity changing unit 252 of the bag-making and packaging machine 200A utilizes a contact signal for the instruction to change the processing capacities of the combination weighing machine 100B and the bag-making and packaging machine 200B. Furthermore, the capacity changing unit 252 of the bag-making and packaging machine 200B utilizes a contact signal for the instruction to change the processing capacities of the combination weighing machine 100A and the bag-making and packaging machine 200A.

In this weighing and packaging system 1000, by utilizing the contact signal, when a problem occurs in some of the plural weighing and packaging units 300, the processing capacities of at least some of the other weighing and packaging units 300 can be changed with a relatively simple and inexpensive configuration (e.g., with just a signal line and a relay).

5-6

In the weighing and packaging system 1000 pertaining to an example of this embodiment, the contact signal is a signal that indicates whether or not the bag-making and packaging machine 200 is operating.

In this weighing and packaging system 1000, when a problem occurs in some of the weighing and packaging units 300, the processing capacities of at least some of the other weighing and packaging units 300 can be changed using the contact signal that indicates that the bag-making and packaging machine 200 is operating or has stopped—in other words, with a relatively simple and inexpensive configuration such as a relay.

5-7

In the weighing and packaging system 1000 pertaining to an example of this embodiment, the bag-making and packaging machine 200 whose processing capacity is to be changed by the capacity changing unit 252 has its packageable capacity set to the maximum packaging capacity Pmax. When the bag-making and packaging machine 200 whose processing capacity is to be changed by the capacity changing unit 252 is not instructed to change its processing capacity by the capacity changing unit 252, it runs at a processing capacity (a second capacity) lower than the maximum packaging capacity Pmax (a first capacity) by increasing its standby time.

In this weighing and packaging system 1000, the bag-making and packaging machine 200 is set so as to be capable of running at a high processing capacity beforehand. Specifically, in the bag-making and packaging machine 200, regardless of the value of its processing capacity, the printing speed of the printing mechanism 205, the speed at which the film F is conveyed by the conveyance mechanisms 220, the time in which the longitudinal sealing is performed by the longitudinal sealing mechanism 230, and the time in which the transverse sealing is performed by the transverse sealing mechanism 240 remain the same. The processing capacity of the bag-making and packaging machine 200 is changed by changing just its standby time. For that reason, it is easy for the bag-making and packaging machine 200 to respond immediately to an instruction to change its processing capacity from the capacity changing unit 252.

5-8

In the weighing and packaging system 1000 of an example of this embodiment, the combination weighing machine 100 whose processing capacity is to be changed by the capacity changing unit 252 has its weighable capacity set to the maximum combination weighing capacity Wmax. When the combination weighing machine 100 whose processing capacity is to be changed by the capacity changing unit 252 is not instructed to change its processing capacity by the capacity changing unit 252, it runs at a processing capacity (a fourth capacity) lower than the maximum combination weighing capacity Wmax (a third capacity) by increasing its standby time.

In this weighing and packaging system 1000, the combination weighing machine 100 is set so as to be capable of running at a high processing capacity beforehand. Specifically, in the combination weighing machine 100, regardless of the value of its processing capacity, the time for measurement by the weight sensors 160 and the standard time for the combination calculation by the controller 170 remain the same. The processing capacity of the combination weighing machine 100 is changed by changing just its standby time. For that reason, it is easy for the combination weighing machine 100 to respond immediately to an instruction to change its processing capacity from the capacity changing unit 252.

(6) Example Modifications

Example modifications of the above embodiment will be described below. It will be noted that the following example modifications can also be appropriately combined to the extent that they are not incompatible with each other.

(6-1) Example Modification A

The function of changing, in a case where a problem is occurring in at least one of the weighing and the packaging in any of the weighing and packaging units 300, the processing capacities of the combination weighing machine 100 and the bag-making and packaging machine 200 in at least some of the weighing and packaging units 300 other than the weighing and packaging unit 300 in which the problem is occurring (hereinafter, in the description of example modification A, this function will be called a "first function" to simplify the description) can also be switchable between utilization and non-utilization. This will be described by way of a specific example.

The above embodiment described as an example a configuration where, in a case where there are two weighing and packaging units 300A, 300B and the bag-making and packaging machines 200A, 200B are configured to output a contact signal while they are operating, when the contact signal is not input to one bag-making and packaging machine 200A, 200B from the other bag-making and packaging machine 200B, 200A, the processing capacity of the bag-making and packaging machine 200A, 200B is changed from the first packaging capacity P1 to the second packaging capacity P2 (and the combination weighing capacity of the combination weighing machine 100A, 100B is also changed in accordance therewith).

However, depending on the situation, a case is conceivable where a sufficient processing capacity is achieved by operating just one of the two weighing and packaging units 300A, 300B and where it is unnecessary to operate the other weighing and packaging unit 300B, 300A. In such a case, even if the operation of one weighing and packaging unit 300B, 300A stops, it may be unnecessary to increase the processing capacity of the other weighing and packaging unit 300A, 300B. Thus, for example, the weighing and packaging system can also be configured in such a way that switches for switching between utilization and non-utilization of the first function are provided in the weighing and packaging units 300A, 300B, so that it is possible to switch to non-utilization of the first function in a case where it is inherently unnecessary to operate the other weighing and packaging unit 300B, 300A. In a case where the first function is switched to non-utilization, the bag-making and packaging machine 200A, 200B runs at the set first packaging capacity P1 regardless of whether or not the contact signal from the bag-making and packaging machine 200B, 200A is input. Since the operation of the bag-making and packaging machine 200A, 200B in the case of utilizing the first function has already been described, description thereof will be omitted.

(6-2) Example Modification B

In the above embodiment, each of the plural weighing and packaging units 300A, 300B has the capacity changing unit 252, but the weighing and packaging system is not limited to this. For example, some of the plural weighing and packaging units 300 can have the capacity changing unit 252. For example, in the above embodiment, just the weighing and packaging unit 300A can have the capacity changing unit 252. However, to reduce a reduction in the capacity of the weighing and packaging system 1000 also in a case where a problem has occurred in any of the plural weighing and packaging units 300, it is preferred that each of the plural weighing and packaging units 300 have the capacity changing unit 252.

(6-3) Example Modification C

In the above embodiment, each of the plural weighing and packaging units 300 has the capacity changing unit 252, but the weighing and packaging system is not limited to this.

Figure 5:
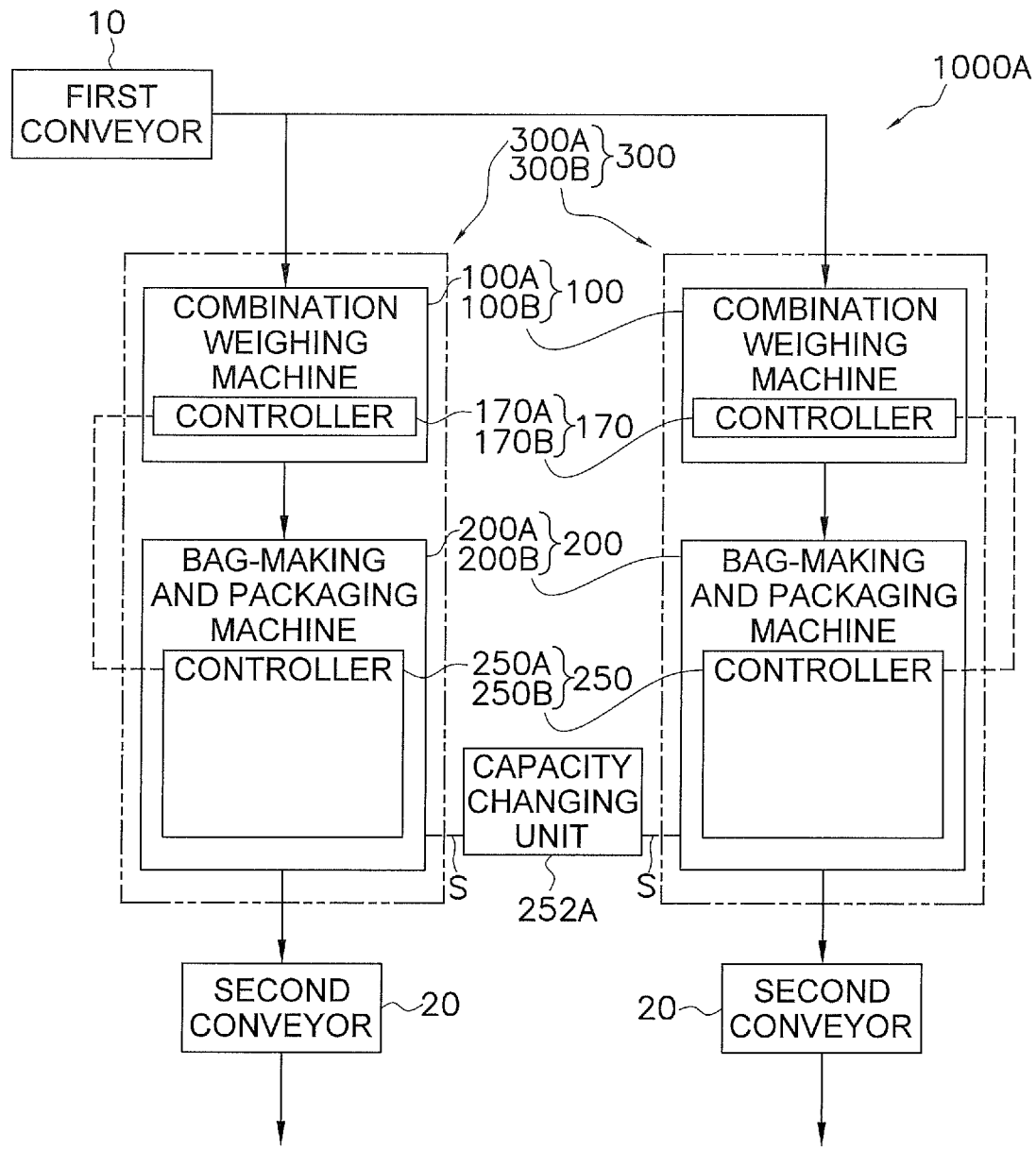
FIG. 5 is a block diagram of a weighing and packaging system pertaining to example modification C.

For example, a weighing and packaging system 1000A shown in FIG. 5 can have a capacity changing unit 252A shared by the plural weighing and packaging units 300 (in FIG. 5, weighing and packaging units 300A and 300B).

The capacity changing unit 252A is communicably connected via communication lines S to each of the plural weighing and packaging units 300A, 300B. For example, in this example modification, the capacity changing unit 252A is communicably connected via the communication lines S to the controllers 250A, 250B of the bag-making and packaging machines 200A, 200B of each weighing and packaging unit 300A, 300B. It will be noted that the capacity changing unit 252A can also be communicably connected via a network such as the internet to the weighing and packaging units 300A, 300B.

The controllers 250A, 250B send information relating to the operating conditions of each weighing and packaging unit 300A, 300B to the capacity changing unit 252A. The information relating to the operating conditions of the weighing and packaging units 300A, 300B includes information as to whether or not a problem is occurring in at least one of the weighing by the combination weighing machines 100A, 100B and the packaging by the bag-making and packaging machines 200A, 200B in the weighing and packaging units 300A, 300B.

The capacity changing unit 252A uses the received information relating to the operating conditions of the weighing and packaging units 300A, 300B to monitor the operating conditions of the plural weighing and packaging units 300A, 300B. Additionally, in a case where a problem is occurring in at least one of the weighing by the combination weighing machine 100A, 100B and the packaging by the bag-making and packaging machine 200A, 200B in any of the weighing and packaging units 300A, 300B, the capacity changing unit 252A sends, to the weighing and packaging unit 300A, 300B other than the weighing and packaging unit 300A, 300B in which the problem is occurring, a command to change its processing capacity.

It will be noted that FIG. 5 shows as an example a case where there are two weighing and packaging units 300, but in a case where there are three or more weighing and packaging units 300 and a problem is occurring in at least one of the weighing by the combination weighing machine 100 and the packaging by the bag-making and packaging machine 200 in any of the plural weighing and packaging units 300, the capacity changing unit 252A can send, to at least some of the weighing and packaging units 300 other than the weighing and packaging unit 300 in which the problem is occurring, a command to change its processing capacity.

By configuring the weighing and packaging system in this way, the plural weighing and packaging units 300 can be managed by the one capacity changing unit 252A, and a reduction in the processing capacity of the weighing and packaging system 1000A caused by a problem in some of the weighing and packaging units 300 can be reduced. It will be noted that the capacity changing unit 252A is, for example, installed in one of the plural weighing and packaging units 300.

(6-4) Example Modification D

The above embodiment described as an example a case where the weighing and packaging system 1000 has two weighing and packaging units 300, but the weighing and packaging system 1000 can also have three or more weighing and packaging units 300.

In this case, in a case where a problem with the combination weighing machine 100 and/or the bag-making and packaging machine 200 is occurring in one of the weighing and packaging units 300, the capacity changing unit 252 can change the processing capacities of the combination weighing machine 100 and the bag-making and packaging machine 200 in one of the weighing and packaging units 300 in which the problem is not occurring. Alternatively, in a case where a problem with the combination weighing machine 100 and/or the bag-making and packaging machine 200 is occurring in one of the weighing and packaging units 300, the capacity changing unit 252 can change the processing capacities of the combination weighing machine 100 and the bag-making and packaging machine 200 in a plurality of the weighing and packaging units 300 in which the problem is not occurring.

Furthermore, the capacity changing unit 252 can change, in accordance with the number of weighing and packaging units 300 in which a problem is occurring in the combination weighing machine 100 and/or the bag-making and packaging machine 200, the number of weighing and packaging units 300 in which it changes the processing capacities of the combination weighing machine 100 and the bag-making and packaging machine 200 and in which a problem is not occurring. Specifically, as the number of weighing and packaging units 300 in which a problem is occurring in the combination weighing machine 100 and/or the bag-making and packaging machine 200 increases, the capacity changing unit 252 can increase the number of weighing and packaging units 300 in which it changes the processing capacities of the combination weighing machine 100 and the bag-making and packaging machine 200 and in which a problem is not occurring.

Furthermore, in a case where it is possible to change the packaging capacities of the bag-making and packaging machines 200 in plural stages to packaging capacities greater than the first packaging capacity P1, the capacity changing unit 252 can also change the processing capacities of the bag-making and packaging machines 200 so that, as the number of weighing and packaging units 300 in which a problem is occurring in the combination weighing machine 100 and/or the bag-making and packaging machine 200 increases, the processing capacities of the bag-making and packaging machines 200 of the weighing and packaging units 300 in which a problem is not occurring increase.

Below, specific examples of cases where there are three or more weighing and packaging units 300 will be described.

(A) Example 1

In example 1, it will be supposed that, as in the above embodiment, each of the bag-making and packaging machines 200 of the weighing and packaging units 300 has the capacity changing unit 252. Additionally, it will be supposed that the bag-making and packaging machine 200 of at least one weighing and packaging unit 300 (for convenience of description, there will be cases where this is called "the first weighing and packaging unit") is directly connected by physical communication lines S to each of the bag-making and packaging machines 200 of a plurality of the weighing and packaging units 300 other than the first weighing and packaging unit (for convenience of description, there will be cases where these are called "the other weighing and packaging units"). It will be noted that the first weighing and packaging unit can also be directly connected by physical communication lines S to each of the bag-making and packaging machines 200 of all of the weighing and packaging units 300 other than the first weighing and packaging unit. Furthermore, the first weighing and packaging unit can also be directly connected by physical communication lines S to each of the bag-making and packaging machines 200 of some or a plurality of the weighing and packaging units 300 other than the first weighing and packaging unit.

Furthermore, it will be supposed that the capacity changing unit 252 of each weighing and packaging unit 300 is configured to output a contact signal to the communication line S while the bag-making and packaging machine 200 of that weighing and packaging unit 300 is operating.

In this configuration, the controller 250 of the bag-making and packaging machine 200 of the first weighing and packaging unit changes the processing capacity of the bag-making and packaging machine 200 from the first packaging capacity P1 to the second packaging capacity P2 in a case where the bag-making and packaging machine 200 is operating and there is a predetermined number or more (e.g., one or more) of communication lines S to which the contact signal is not being input among the communication lines S connected to the first weighing and packaging unit.

Alternatively, the controller 250 of the first weighing and packaging unit can be configured to be capable of changing the processing capacity of the bag-making and packaging machine 200 in two or more stages and, as the number of communication lines S to which the contact signal is not being input increases among the communication lines S connected to the first weighing and packaging unit, increase the processing capacity of the bag-making and packaging machine 200. It suffices to appropriately design how much the controller 250 increases the processing capacity of the bag-making and packaging machine 200 of the first weighing and packaging unit in accordance with the increase in the number of communication lines S to which the contact signal is not being input. By configuring the weighing and packaging system in this way, it is easy to balance a reduction in processing capacity caused by a problem in some of the weighing and packaging units 300 with an increase in the processing capacities of the weighing and packaging units 300 to compensate for the reduction.

Furthermore, in another example, the three or more weighing and packaging units 300 can also be grouped into plural groups. For example, the three or more weighing and packaging units 300 can be grouped by the products they produce. Additionally, the group to which the first weighing and packaging unit belongs is stored in a storage unit (not shown in the drawings) of the controller 250 of the bag-making and packaging machine 200 of the first weighing and packaging unit. Furthermore, the groups to which each of the plural weighing and packaging units 300 connected by the communication lines S to the first weighing and packaging unit belong are associated with the communication lines S and stored in the storage unit of the controller 250 of the first weighing and packaging unit. It will be noted that the information relating to the groups to which the weighing and packaging units 300 belong and stored in the storage unit of the controller 250 can be directly changed utilizing an input unit not shown in the drawings, it can also be automatically changed from information such as production reservations input to the weighing and packaging units 300.

The controller 250 of the first weighing and packaging unit performs the following process in a case where the bag-making and packaging machine 200 of the first weighing and packaging unit is operating and there is a communication line S to which the contact signal is not being input among the communication lines S connected to the first weighing and packaging unit. First, in a case where the group, to which the weighing and packaging unit 300 stored in the storage unit in association with the communication line S to which the contact signal is not being input belongs, coincides with the group to which the first weighing and packaging unit belongs, the controller 250 of the first weighing and packaging unit changes the processing capacity of the bag-making and packaging machine 200 from the first packaging capacity P1 to the second packaging capacity P2. On the other hand, in a case where the group, to which the weighing and packaging unit 300 stored in the storage unit in association with the communication line S to which the contact signal is not being input belongs, does not coincide with the group to which the first weighing and packaging unit belongs, the controller 250 of the first weighing and packaging unit does not change the processing capacity of the bag-making and packaging machine 200 (it maintains the processing capacity at the first packaging capacity P1).

(B) Example 2

In example 2, it is supposed that some of the weighing and packaging units 300 in the weighing and packaging system have the capacity changing unit 252A such as described in example modification C instead of all of the weighing and packaging units 300 having the capacity changing unit 252. The weighing and packaging system can have just one capacity changing unit 252A or can have plural capacity changing units 252A. As a specific configuration, for example, the controllers 250 of some of the weighing and packaging units 300 also function as the capacity changing units 252A. Each weighing and packaging unit 300 is connected by a physical communication line S to at least one of the capacity changing units 252A. Additionally, each capacity changing unit 252A is connected by physical communication lines S to three or more weighing and packaging units 300. In other words, in the weighing and packaging system of example 2, each weighing and packaging unit 300 is directly connected via the capacity changing units 252A to plural weighing and packaging units 300 other than that weighing and packaging unit 300. Here, each weighing and packaging unit 300 is configured to output a contact signal to the communication line S while the bag-making and packaging machine 200 of that weighing and packaging unit 300 is operating. Additionally, the capacity changing units 252A are configured to judge, in a case where the contact signal is not input to a communication line S, that the weighing and packaging unit 300 connected to that communication line S has stopped due to a problem.

Additionally, the capacity changing unit 252A here, in a case where there is a predetermined number or more (e.g., one or more) of communication lines S to which the contact signal is not being input among the communication lines S connected to it, sends by wire or wirelessly, to the bag-making and packaging machines 200 of the weighing and packaging units 300 connected to the communication line S to which the contact signal is being input, a command to change their processing capacity. The command to change the processing capacity here is a command that requests that the processing capacity of the bag-making and packaging machine 200 be changed (increased) from the first packaging capacity P1 to a packaging capacity greater than the first packaging capacity P1.

It will be noted that although description is omitted here for the sake of avoiding redundant description, some or all of the configurations described in example 1 above can also be appropriately applied to a case where, as in example 2, the weighing and packaging system has a capacity changing unit 252A shared by a plurality of weighing and packaging units 300.

Furthermore, in example 1 and example 2 above, a case where the weighing and packaging units 300 are directly connected to each other by physical communication lines S (including a case where the weighing and packaging units 300 are directly connected to each other by the capacity changing units 252A serving as relays) are described. However, some or all of the configurations described in example 1 and example 2 above can also be applied to a case where the weighing and packaging units 300 communicate wirelessly with each other and a case where the weighing and packaging units 300 and the capacity changing units 252A communicate wirelessly with each other.

(6-5) Example Modification E

The above embodiment described as an example a case where the processing capacities during normal operation of the plural weighing and packaging units 300 (the combination weighing capacities of the combination weighing machines 100 and the packaging capacities of the bag-making and packaging machines 200 during normal operation of each weighing and packaging unit 300) are equal to each other. However, the weighing and packaging system is not limited to this, and the processing capacities during normal operation of the plural weighing and packaging units 300 may be not the same. Furthermore, the processing capacities of the weighing and packaging units 300 after their processing capacities have been changed by the capacity changing unit 252 can also differ for each weighing and packaging unit 300.

(6-6) Example Modification F

In the above embodiment, the time in which the weight sensors 160 measure the weights of the articles C in the weigh hoppers 140 and the average time required for the combination calculation by the controller 170 are described as remaining the same even when the value of the combination weighing capacity of the combination weighing machine 100 changes. However, in the combination weighing machine 100, the time in which the weight sensors 160 measure the weights of the articles C in the weigh hoppers 140 and the average time required for the combination calculation by the controller 170 can also change in accordance with the value of the combination weighing capacity.

However, to respond immediately to a change in the combination weighing capacity, it is preferred that the time in which the weight sensors 160 measure the weights of the articles C in the weigh hoppers 140 and the average time required for the combination calculation by the controller 170 remain the same even when the value of the combination weighing capacity changes.

(6-7) Example Modification G

In the above embodiment, the speeds of the various mechanisms in the bag-making and packaging machines 200 are described as remaining the same regardless of the value of the packaging capacity. It will be noted that the "speeds of the various mechanisms" here include, for example, the printing speed of the printing mechanism 205, the speed at which the film F is conveyed by the conveyance mechanisms 220, and the time in which the transverse sealing is performed by the transverse sealing mechanism 240. However, in the bag-making and packaging machines 200, the speeds of the various mechanisms can also change depending on the value of the packaging capacity.

However, to respond immediately to a change in packaging capacity, it is preferred that the speeds of the various mechanisms remain the same even when the value of the packaging capacity changes.

(6-8) Example Modification H

The above embodiment described as an example a case where the bag-making and packaging machines 200 run in an intermittent operating mode. However, the technology of the above embodiment can also be applied to a weighing and packaging system having, as the weighing machines, bag-making and packaging machines that run in a continuous operating mode.

(6-9) Example Modification I

Figure 6:
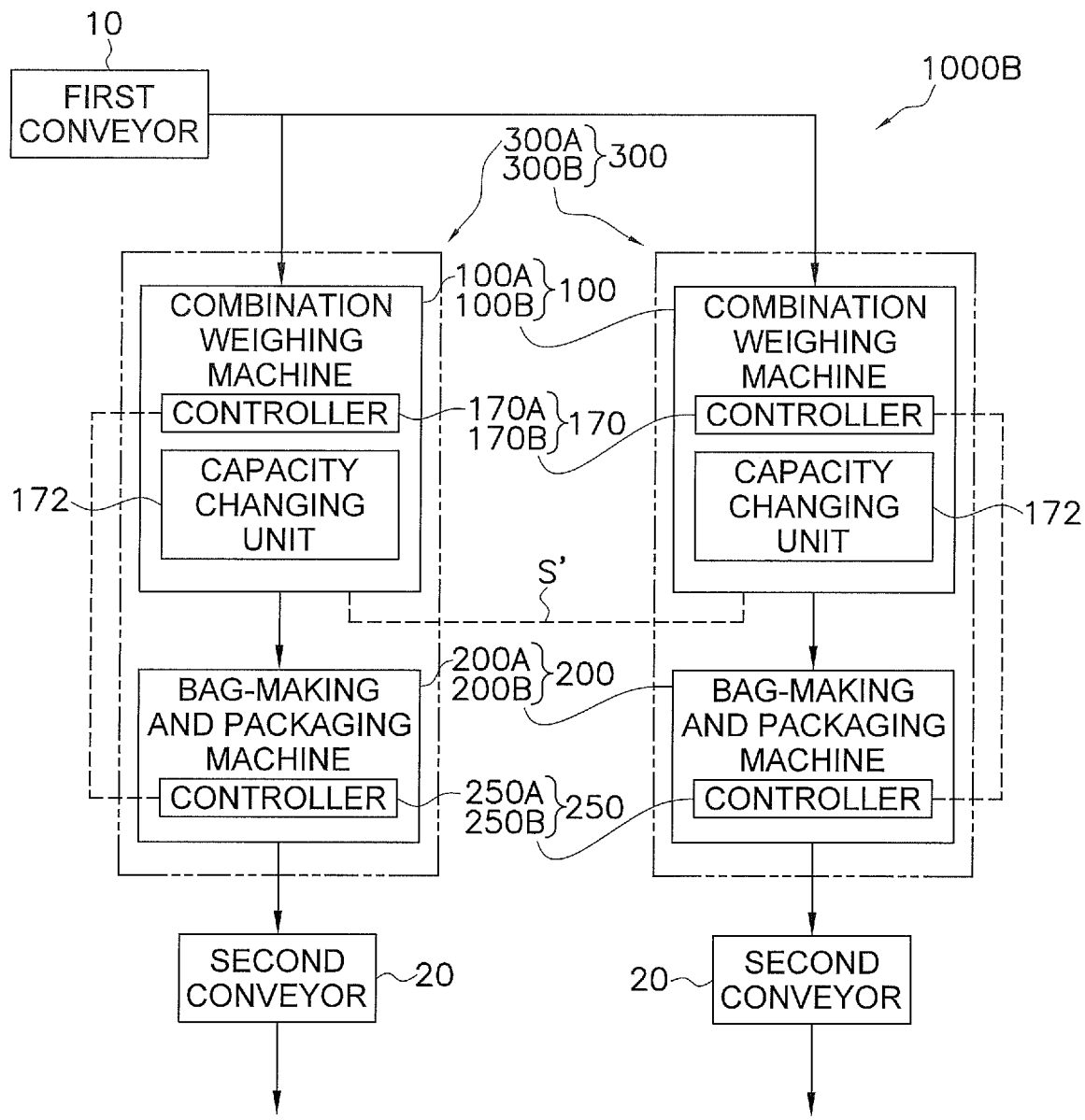
FIG. 6 is a block diagram of a weighing and packaging system pertaining to example modification I.

Within the above embodiment, an example (example implementation 1) is described where the bag-making and packaging machine 200A of the weighing and packaging unit 300A and the bag-making and packaging machine 200B of the weighing and packaging unit 300B are interconnected by the physical communication line S. Instead of this, in the weighing and packaging system of this invention, as in a weighing and packaging system 1000B of FIG. 6, the combination weighing machine 100A of the weighing and packaging unit 300A and the combination weighing machine 100B of the weighing and packaging unit 300B can be interconnected by physical communication lines S'. Furthermore, in the above embodiment, each of the bag-making and packaging machine 200A and the bag-making and packaging machine 200B has the capacity changing unit 252 that outputs a contact signal. Instead of this, in the weighing and packaging system of this invention, as in a weighing and packaging system 1000B of FIG. 6, each of the combination weighing machine 100A and the combination weighing machine 100B can have a capacity changing unit 172 serving as an example of a control unit that outputs a contact signal.

For example, the capacity changing unit 172 of the combination weighing machine 100A outputs the contact signal to the combination weighing machine 100B via a communication line S' when the combination weighing machine 100A is operating but does not output the contact signal when the combination weighing machine 100A stops. Furthermore, the capacity changing unit 172 of the combination weighing machine 100B outputs the contact signal to the combination weighing machine 100A via another communication line S' when the combination weighing machine 100B is operating but does not output the contact signal when the combination weighing machine 100B stops. For example, specifically, the capacity changing units 172 of the combination weighing machines 100A, 100B stop outputting the contact signal in a case where some problem occurs in the combination weighing machines 100A, 100B such that the combination weighing machines 100A, 100B cannot run (have stopped). Furthermore, for example, the capacity changing units 172 of the combination weighing machines 100A, 100B stop outputting the contact signal in a case where, even though the combination weighing machines 100A, 100B are operating, the article request signal is not sent from the bag-making and packaging machines 200A, 200B for a period of time longer than a predetermined amount of time.

Furthermore, conversely, the capacity changing units 172 of the combination weighing machines 100A, 100B may also not output the contact signal when the combination weighing machines 100A, 100B are operating and output the contact signal to the combination weighing machines 100B, 100A via the communication lines S' when the combination weighing machines 100A, 100B have stopped.

In short, in the weighing and packaging system 1000B, the capacity changing unit 172 of the combination weighing machine 100A uses the contact signal that is output via the communication line S' to notify the combination weighing machine 100B that the combination weighing machine 100A has stopped for some reason. Furthermore, in the weighing and packaging system 1000B, the capacity changing unit 172 of the combination weighing machine 100B uses the contact signal that is output via the communication line S' to notify the combination weighing machine 100A that the combination weighing machine 100B has stopped for some reason.

It will be noted that when the combination weighing machines 100A, 100B stop, the articles C are no longer supplied to the downstream bag-making and packaging machines 200A, 200B. As a result, the downstream bag-making and packaging machines 200A, 200B also stop operating. Furthermore, conversely, when the bag-making and packaging machines 200A, 200B stop, the combination weighing machines 100A, 100B cannot supply the articles C to the downstream bag-making and packaging machines 200A, 200B (they do not receive the article request signal). As a result the combination weighing machines 100A, 100B also stop operating.

Below, the actions of the weighing and packaging system 1000B will be described taking as an example a case where the combination weighing machine 100A has stopped for some reason while the weighing and packaging unit 300A and the weighing and packaging unit 300B are operating. It will be noted that the actions of the weighing and packaging system 1000B in a case where the combination weighing machine 100B has stopped are the same except that it is the weighing and packaging unit 300A that changes its processing capacity rather than the weighing and packaging unit 300B, so description thereof will be omitted.

First, in the weighing and packaging system 1000B of this example modification, the controller 170B of the combination weighing machine 100B is configured to send a predetermined signal to the controller 250B of the bag-making and packaging machine 200B in a case where the combination weighing machine 100A has stopped. Specifically, in a case where the capacity changing unit 172 of the combination weighing machine 100A is configured to stop sending the contact signal when the combination weighing machine 100A stops, the controller 170B of the combination weighing machine 100B sends the predetermined signal (called a first signal) to the controller 250B of the bag-making and packaging machine 200B in a case where the contact signal is not being input via the communication line S' from the combination weighing machine 100A. Furthermore, in a case where the capacity changing unit 172 of the combination weighing machine 100A is configured to send the contact signal when the combination weighing machine 100A stops, the controller 170B of the combination weighing machine 100B sends the first signal to the controller 250B of the bag-making and packaging machine 200B in a case where the contact signal is being input via the communication line S' from the combination weighing machine 100A.

The controller 250B that has received the first signal from the controller 170B is designed to change the processing capacity of the bag-making and packaging machine 200B from the first packaging capacity P1 to the second packaging capacity P2. For that reason, here, in a case where a problem is occurring in at least one of the weighing by the combination weighing machine 100A and the packaging by the bag-making and packaging machine 200A, the processing capacity of the bag-making and packaging machine 200B is changed from the first packaging capacity P1 to the second packaging capacity P2. Furthermore, when the processing capacity of the bag-making and packaging machine 200B is changed from the first packaging capacity P1 to the second packaging capacity P2, the processing capacity of the combination weighing machine 100B is also changed from the combination weighing capacity corresponding to the first packaging capacity P1 to the combination weighing capacity corresponding to the second packaging capacity P2.

That is, in a case where a problem is occurring in at least one of the weighing by the combination weighing machine 100A and the packaging by the bag-making and packaging machine 200A, the capacity changing unit 172 of the combination weighing machine 100A changes the processing capacities of the combination weighing machine 100B and the bag-making and packaging machine 200B.

Furthermore, the capacity changing unit 172 of the combination weighing machine 100A notifies the weighing and packaging unit 300B, as an instruction to change the processing capacities of the combination weighing machine 100B and the bag-making and packaging machine 200B, that at least one of the combination weighing machine 100A and the bag-making and packaging machine 200A has stopped in the weighing and packaging unit 300A in which the problem is occurring.

Furthermore, the capacity changing unit 172 of the combination weighing machine 100A utilizes the contact signal for the instruction to change the processing capacities of the combination weighing machine 100B and the bag-making and packaging machine 200B. For example, the contact signal here is a signal that indicates whether or not the combination weighing machine 100A is operating. In this way, by utilizing the contact signal, when a problem occurs in the weighing and packaging unit 300A, the processing capacity of the other weighing and packaging unit 300B can be changed by simply interconnecting the weighing and packaging units 300A, 300B with the communication line S' and without using a complicated control device.

(6-10) Example Modification J

The configuration of example modification I, wherein the combination weighing machines 100A, 100B have the capacity changing units 172, can also be applied to a case where contact signals are not utilized for the instruction to change the processing capacities of the combination weighing machines 100A, 100B and the bag-making and packaging machines 200A, 200B.

Furthermore, the configuration of example modification I, wherein the combination weighing machines 100A, 100B have the capacity changing units 172, can also be applied to a case where the instruction to change the processing capacities of the combination weighing machines 100A, 100B and the bag-making and packaging machines 200A, 200B is sent wirelessly (without using a physical signal line).

(6-11) Example Modification K

Figure 7:
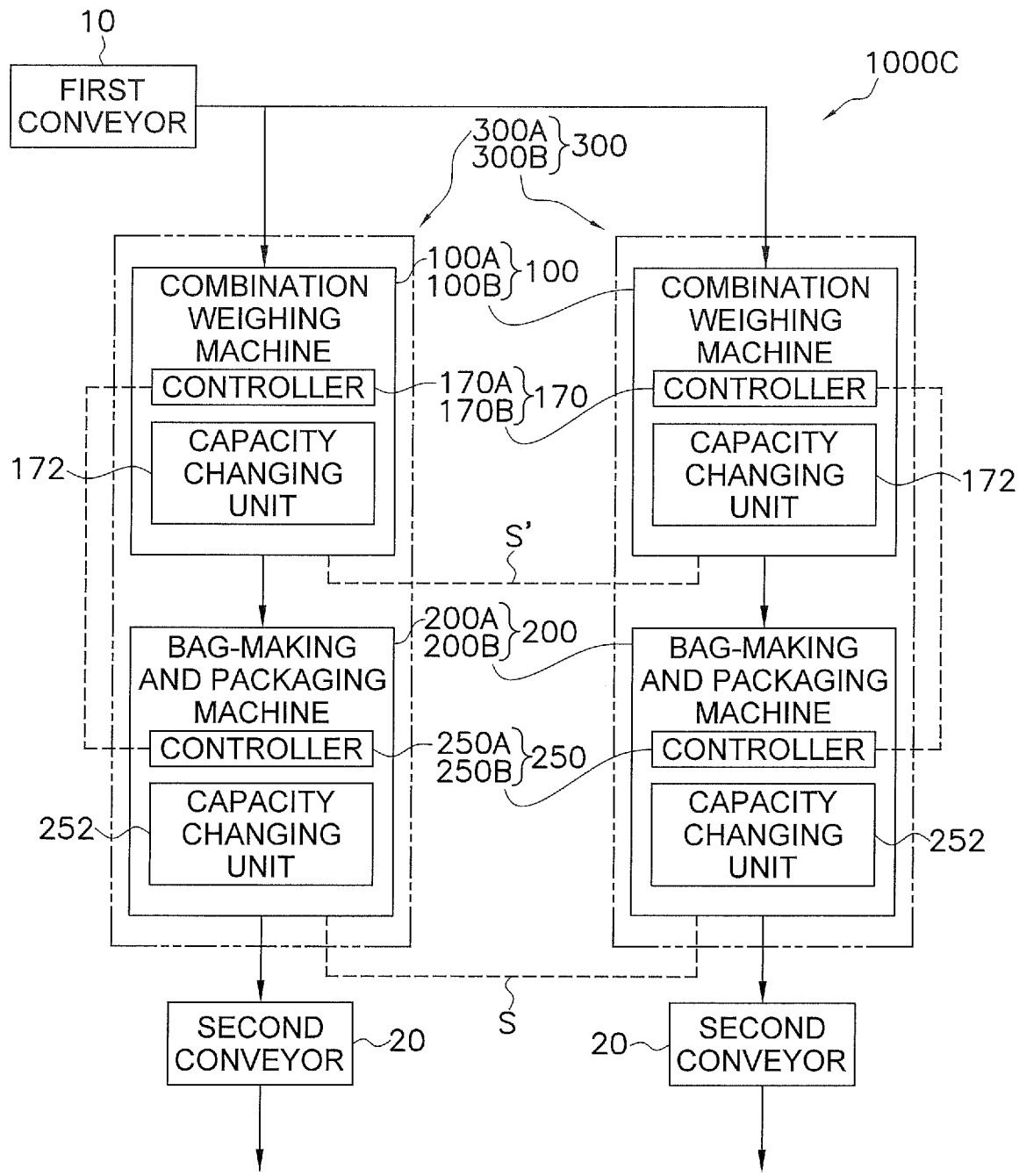
FIG. 7 is a block diagram of a weighing and packaging system pertaining to example modification K.

In the weighing and packaging system of the invention, the configuration of example implementation 1 of the above embodiment, wherein the bag-making and packaging machine 200B, 200A is notified by the contact signal via the communication line S that the bag-making and packaging machine 200A, 200B is operating or has stopped, and the configuration of example modification H, wherein the combination weighing machine 100B, 100A is notified by the contact signal via the communication line S' that the combination weighing machine 100A, 100B is operating or has stopped, can also be combined and utilized as in a weighing and packaging system 1000C of FIG. 7. In the weighing and packaging system 1000C, in a case where a problem is occurring in at least one of the weighing by the combination weighing machine 100A, 100B and the packaging by the bag-making and packaging machine 200A, 200B in any of the weighing and packaging units 300A, 300B, the capacity changing units 172, 252 change the processing capacities of the combination weighing machine 100B, 100A and the bag-making and packaging machine 200B, 200A of at least some of the weighing and packaging units 300B, 300A other than the weighing and packaging unit 300A, 300B in which the problem is occurring.

It will be noted that the weighing and packaging units 300A, 300B of the weighing and packaging system can also notify the weighing and packaging units 300B, 300A that the bag-making and packaging machines 200A, 200B are operating or have stopped and that the combination weighing machines 100A, 100B are operating or have stopped using only the communication lines S that interconnect the bag-making and packaging machine 200A and the bag-making and packaging machine 200B or using only the communication lines S' that interconnect the combination weighing machine 100A and the combination weighing machine 100B.

For example, a case where, as in the weighing and packaging system 1000 of FIG. 1, the weighing and packaging units 300A, 300B notify the weighing and packaging units 300B, 300A that the bag-making and packaging machines 200A, 200B are operating or have stopped and that the combination weighing machines 100A, 100B are operating or have stopped using only the communication lines S that interconnect the bag-making and packaging machine 200A and the bag-making and packaging machine 200B will be described as an example. In particular, here, a case where the weighing and packaging unit 300A notifies the weighing and packaging unit 300B that the bag-making and packaging machine 200A is operating or has stopped and that the combination weighing machine 100A is operating or has stopped using the communication line S will be described as an example. It will be noted that here it will be supposed that, in a case where the combination weighing machine 100A has stopped due to some problem while the combination weighing machine 100A is operating, the controller 170A notifies the bag-making and packaging machine 200A thereof.

In a case where the combination weighing machine 100A stops due to a problem (a case where there is a notification thereof from the controller 170A), a case where a problem occurs in the bag-making and packaging machine 200A and it stops, and a case where a problem occurs in both the combination weighing machine 100A and the bag-making and packaging machine 200A and they stop, the capacity changing unit 252 of the bag-making and packaging machine 200A notifies the bag-making and packaging machine 200B of the weighing and packaging unit 300B thereof using the communication line S. In other words, in a case where the combination weighing machine 100A stops due to a problem, a case where a problem occurs in the bag-making and packaging machine 200A and it stops, and a case where a problem occurs in both the combination weighing machine 100A and the bag-making and packaging machine 200A and they stop, the capacity changing unit 252 of the bag-making and packaging machine 200A sends via the communication line S an instruction to change the processing capacities of the combination weighing machine 100B and the bag-making and packaging machine 200B of the weighing and packaging unit 300B.

For example, the capacity changing unit 252 of the bag-making and packaging machine 200A utilizes the contact signal for the instruction to change the processing capacities of the combination weighing machine 100B and the bag-making and packaging machine 200B of the weighing and packaging unit 300B. For example, the capacity changing unit 252 of the bag-making and packaging machine 200A outputs the contact signal in a case where the actions of both the combination weighing machine 100A and the bag-making and packaging machine 200A are normal but does not output the contact signal in a case where there is a problem in at least one of the combination weighing machine 100A and the bag-making and packaging machine 200A. Conversely, the capacity changing unit 252 of the bag-making and packaging machine 200A may also not output the contact signal in a case where the actions of both the combination weighing machine 100A and the bag-making and packaging machine 200A are normal but output the contact signal in a case where there is a problem in at least one of the combination weighing machine 100A and the bag-making and packaging machine 200A.

(6-12) Example Modification L

In the above embodiment, a case where the weighing and packaging units 300 each have one combination weighing machine 100 and one bag-making and packaging machine 200 was described. However, the weighing and packaging system is not limited to this.

For example, the weighing and packaging units 300 can also each have a combination weighing machine 100, which has a collection chute 150 having plural discharge openings for the articles C and is capable of switching the discharge destination of the articles C, and plural bag-making and packaging machines 200, which are disposed in correspondence to each of the discharge openings of the collection chute 150 of the combination weighing machine 100. Furthermore, for example, the weighing and packaging units 300 can also each have plural combination weighing machines 100 and plural bag-making and packaging machines 200 each of which is disposed in correspondence to one of the combination weighing machines 100.

In a case where each weighing and packaging unit 300 has plural bag-making and packaging machines 200, for example, each of the plural bag-making and packaging machines 200 of the weighing and packaging unit 300 is connected by mutually independent physical communication lines S to the other weighing and packaging units 300. Each of the plural bag-making and packaging machines 200 of the weighing and packaging units 300 has a capacity changing unit 252. The capacity changing unit 252 of each bag-making and packaging machine 200 of each weighing and packaging unit 300 sends, while that bag-making and packaging machine 200 is operating, a contact signal to the other weighing and packaging units 300. Additionally, in a case where the contact signal is not sent via the communication lines S from some or all of the bag-making and packaging machines 200 of the other weighing and packaging units 300, the bag-making and packaging machine 200 of the weighing and packaging unit 300 changes (increases) its processing capacity. Even in a case where the weighing and packaging system is configured in this way, a reduction in the processing capacity of the weighing and packaging system caused by a problem in some of the weighing and packaging units 300 can be reduced.

It will be noted that in each weighing and packaging unit 300, the combination weighing machine 100 discharges the articles C to bag-making and packaging machines 200 that have sent the article request signal. Bag-making and packaging machines 200 that have not sent the contact signal, in other words bag-making and packaging machines 200 in which a problem is occurring in their operation, does not send even the article request signal, so the articles C are not supplied to bag-making and packaging machines 200 that do not send the contact signal.

Furthermore, instead of this, the weighing and packaging system can also be configured as follows, for example. In a case where each weighing and packaging unit 300 has plural bag-making and packaging machines 200, each weighing and packaging unit 300 has one capacity changing unit shared by the plural bag-making and packaging machines 200 of that weighing and packaging unit 300. In each weighing and packaging unit 300, the bag-making and packaging machines 200 of that weighing and packaging unit 300 are connected to the capacity changing unit by mutually independent physical signal lines. Additionally, each bag-making and packaging machine 200 sends a contact signal to the capacity changing unit while that bag-making and packaging machine 200 is operating. Furthermore, the capacity changing unit of that weighing and packaging unit 300 is connected by physical signal lines to the other weighing and packaging units 300. In a case where the contact signals are being sent from all the bag-making and packaging machines 200 connected by signal lines to the capacity changing unit of the weighing and packaging unit 300, the capacity changing unit sends a contact signal to the other weighing and packaging units 300 connected to that capacity changing unit. On the other hand, in a case where a contact signal is not being sent from some or all of the bag-making and packaging machines 200 connected by signal lines to the capacity changing unit, the capacity changing unit does not send a contact signal to the other weighing and packaging units 300 connected to that capacity changing unit. Additionally, in a case where the contact signals are not being sent via the signal lines from the capacity changing units of the other weighing and packaging units 300, the bag-making and packaging machines 200 of the weighing and packaging unit 300 change (increase) their processing capacities. Even in a case where the weighing and packaging system is configured in this way, a reduction in the processing capacity of the weighing and packaging system caused by a problem in some of the weighing and packaging units 300 can be reduced.

The present invention is widely and usefully applicable to weighing and packaging systems.

REFERENCE SIGNS LIST 100A, 100B Combination Weighing Machines (Weighing Machines)
172 Capacity Changing Units (Control Unit)
200A, 200B Bag-making and Packaging Machines (Packaging Machines)
252, 252A Capacity Changing Units (Control Units)
300A, 300B Weighing and Packaging Units
1000, 1000A, 1000B, 1000C Weighing and Packaging Systems
C Articles
S, S' Communication Lines (Signal Lines)

What is claimed is:

1. A weighing and packaging system comprising:
   a plurality of weighing machines configured to weigh articles supplied thereto; and
   a plurality of packaging machines, each of which forms a weighing and packaging unit with a corresponding weighing machine out of the plurality of weighing machines, configured to receive a supply of the articles weighed and discharged by the corresponding weighing machine, and package the articles supplied thereto,
   each of the weighing and packaging units having a controller configured to control actions of the weighing machine and the packaging machine of the weighing and packaging unit,
   the controller of a first weighing and packaging unit, in a case where a problem occurs in at least one of weighing by the weighing machine of the first weighing and packaging unit or packaging by the packaging machine of the first weighing and packaging unit, configured to send an instruction to change processing capacities of the weighing machine and the packaging machine to the controller of a second weighing and packaging unit, which is one of the weighing and packaging units other than the first weighing and packaging unit, wherein the controller of the first weighing and packaging unit is configured to send, via a physical signal line, a contact signal as the instruction to change the processing capacities of the weighing machine and the packaging machine to the controller of the second weighing and packaging unit, wherein the contact signal is a signal that notifies whether or not the weighing machine and/or the packaging machine of the first weighing and packaging unit is in operation.

2. A weighing and packaging system comprising:

a plurality of weighing machines configured to weigh articles supplied thereto; and a plurality of packaging machines, each of which forms a weighing and packaging unit with a corresponding weighing machine out of the plurality of weighing machines, configured to receive a supply of the articles weighed and discharged by the corresponding weighing machine, and package the articles supplied thereto, each of the weighing and packaging units having a controller configured to control the actions of the weighing machine and the packaging machine of the weighing and packaging unit, the controller of a first weighing and packaging unit, in a case where a problem occurs in at least one of weighing by the weighing machine of the first weighing and packaging unit or packaging by the packaging machine of the first weighing and packaging unit, configured to send an instruction to change processing capacities of the weighing machine and the packaging machine to the controller of a second weighing and packaging unit, which is one of the weighing and packaging units other than the first weighing and packaging units, wherein a packageable capacity of the packaging machine of the second weighing and packaging unit is set to a first capacity, and in a case where the instruction to change processing capacities of the weighing machine and the packaging machine is not sent to the controller of the second weighing and packaging unit, the packaging machine of the second weighing and packaging unit operates at a second capacity lower than the first capacity by increasing a standby time, and an operating speed of a mechanism of the packaging machine of the second weighing and packaging unit at the first capacity is the same as an operating speed of the mechanism of the packaging machine of the second weighing and packaging unit at the second capacity.

3. The weighing and packaging system according to claim 2, wherein a weighable capacity of the weighing machine, whose processing capacity is changed by the controller, is set to a third capacity, and while the weighing machine is not instructed to change the processing capacity by the controller, the weighing machine operates at a fourth capacity lower than the third capacity by increasing a standby time.

* * * * *